(12) United States Patent
Pouchkarev

(10) Patent No.: US 7,036,771 B1
(45) Date of Patent: May 2, 2006

(54) KITE SAFETY, CONTROL, AND RAPID DEPOWERING APPARATUS

(76) Inventor: Alexander S. Pouchkarev, 1039 Fontana Dr., Alameda, CA (US) 94502

( * ) Notice: Subject to any disclaimer, the term of this patent is extended or adjusted under 35 U.S.C. 154(b) by 0 days.

(21) Appl. No.: 10/914,364

(22) Filed: Aug. 9, 2004

Related U.S. Application Data

(63) Continuation-in-part of application No. 10/613,133, filed on Jul. 3, 2003, now Pat. No. 6,869,047.

(60) Provisional application No. 60/394,364, filed on Jul. 3, 2002.

(51) Int. Cl.
*B64C 31/06* (2006.01)

(52) U.S. Cl. .............. 244/155 A; 244/153 R; 244/152; 244/902

(58) Field of Classification Search ................ 244/142, 244/145, 153 R, 155 A, 902, 152
See application file for complete search history.

(56) References Cited

U.S. PATENT DOCUMENTS

| | | | |
|---|---|---|---|
| 5,366,182 A | 11/1994 | Roeseler et al. | |
| 6,513,759 B1 * | 2/2003 | Starbuck | 244/155 A |
| 6,514,115 B1 | 2/2003 | Harich | |
| 6,581,879 B1 | 6/2003 | Bellecera | |
| 6,691,954 B1 * | 2/2004 | Harrington et al. | 244/155 A |
| 6,830,220 B1 * | 12/2004 | Runyan | 244/155 A |
| 2002/0185570 A1 | 12/2002 | Winner | |
| 2004/0004160 A1 | 1/2004 | Pouchkarev | |
| 2005/0133669 A1 * | 6/2005 | Royannais et al. | |

* cited by examiner

*Primary Examiner*—J. Woodrow Eldred
(74) *Attorney, Agent, or Firm*—Johnson & Stainbrook LLP; Craig M. Stainbrook; Larry D. Johnson

(57) ABSTRACT

A kite safety, control, and depowering device for a kite having an airfoil with leading and trailing edges, at least two control lines attached to the airfoil and a control flying bar attached to at least two of the control lines. The device features a continuous trim and safety flying line disposed at their lower ends over a rapid depowering apparatus. The depowering apparatus includes means for capturing and rapidly releasing an expansion disposed on the trim line, such that when rapid depowering is required, a simply release mechanism may be actuated to change the angle of attack of the airfoil rapidly.

17 Claims, 24 Drawing Sheets

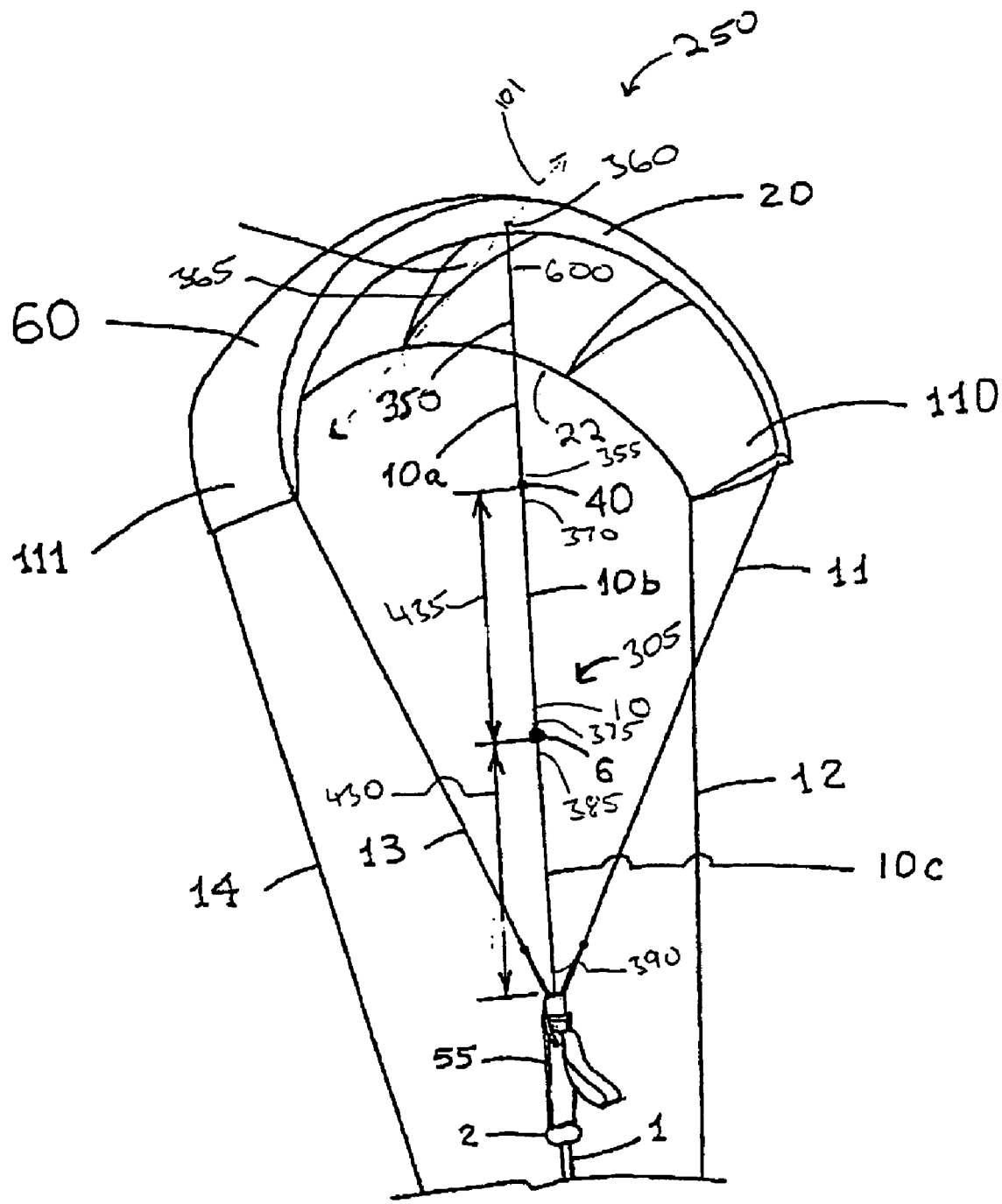
FIG._1

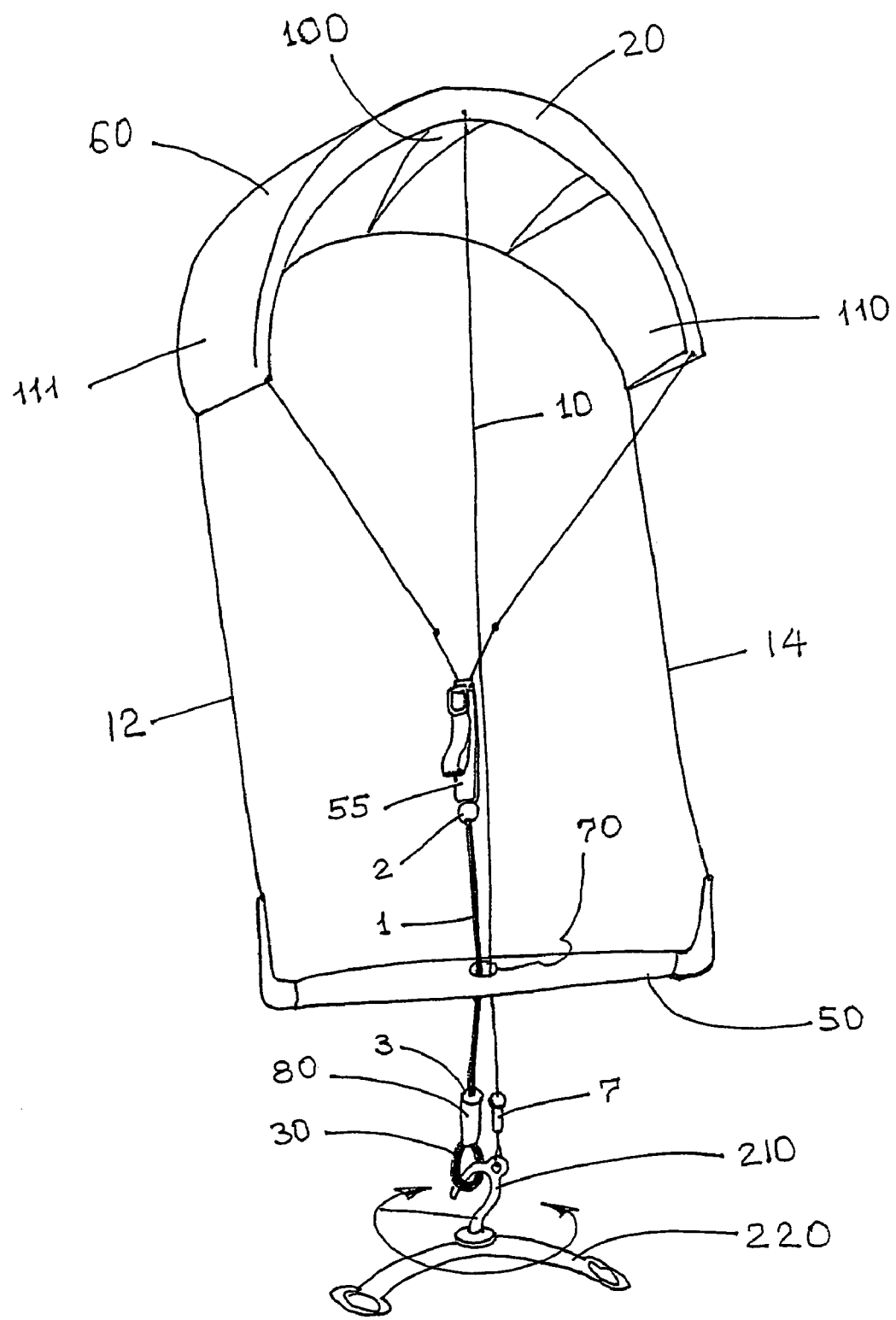
FIG._1A

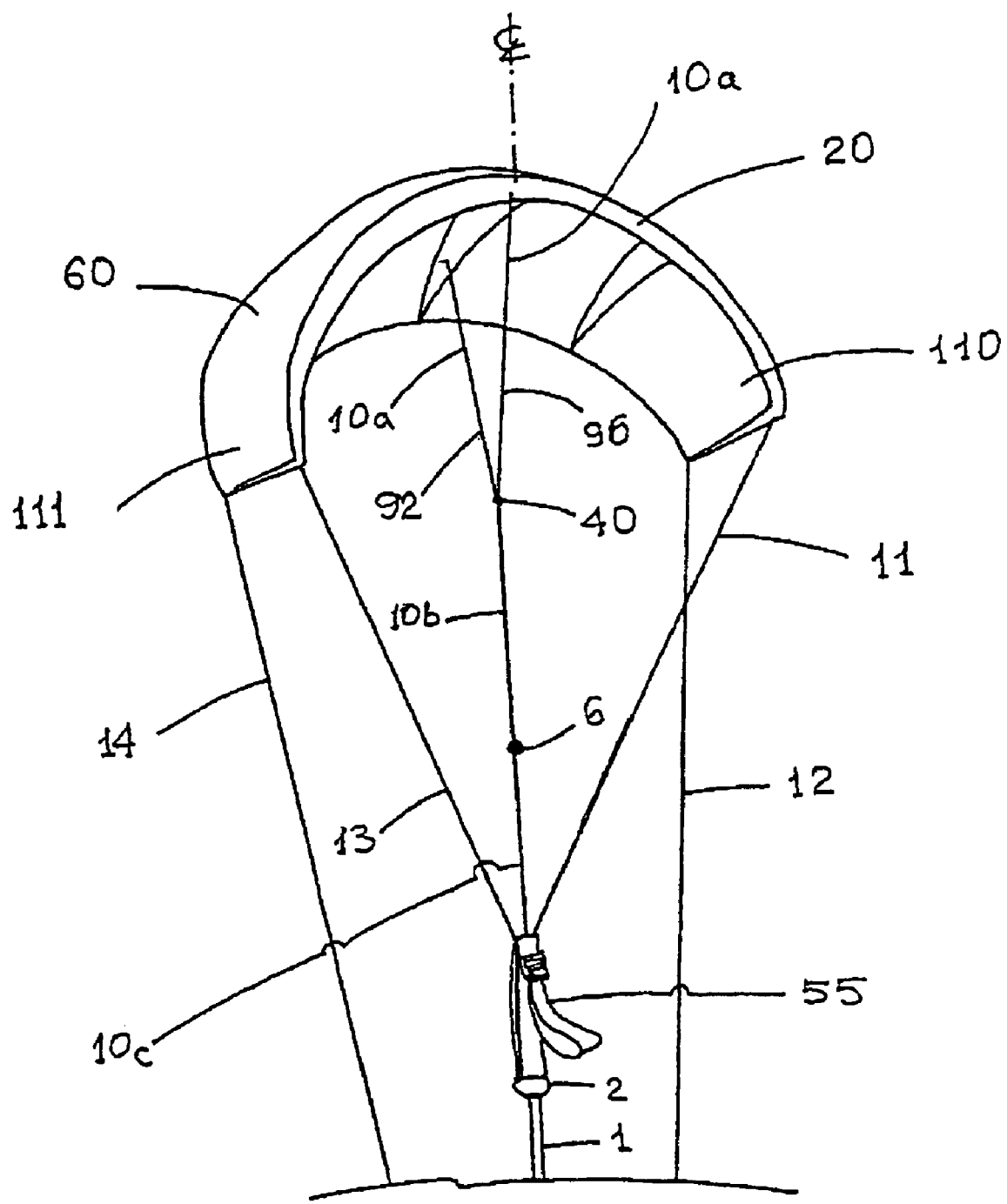
FIG._2

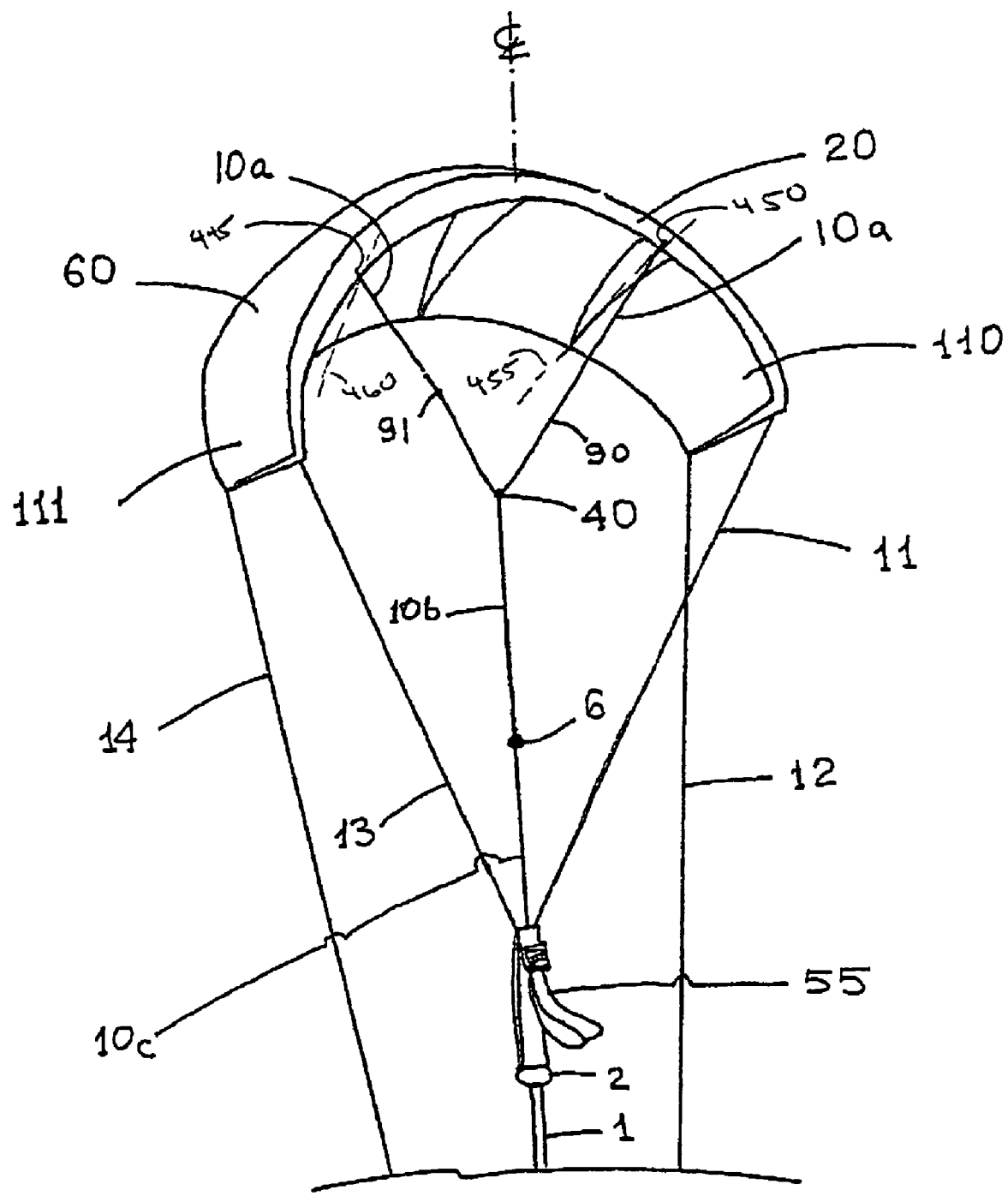
FIG._3

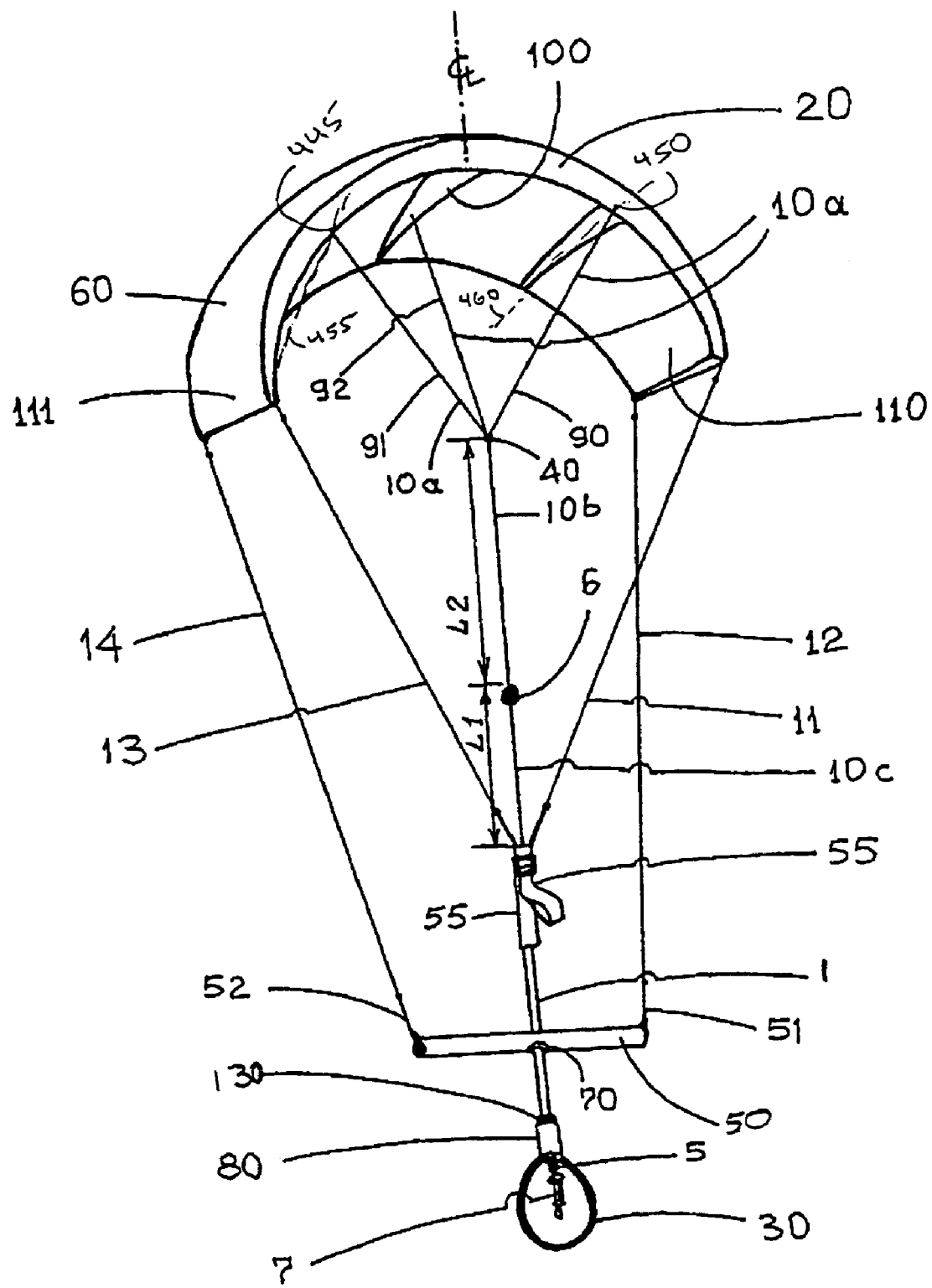
FIG._4

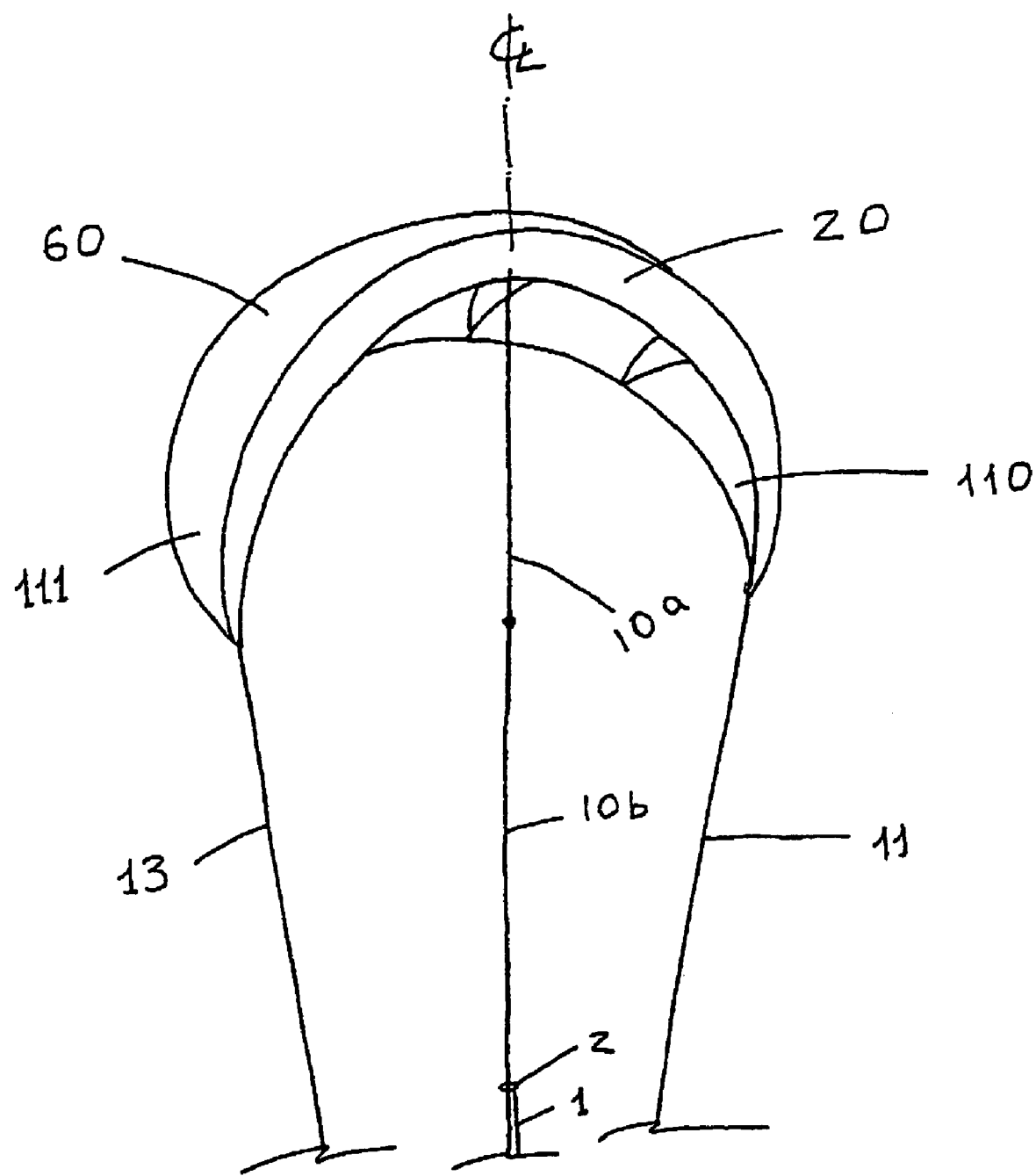
FIG._5

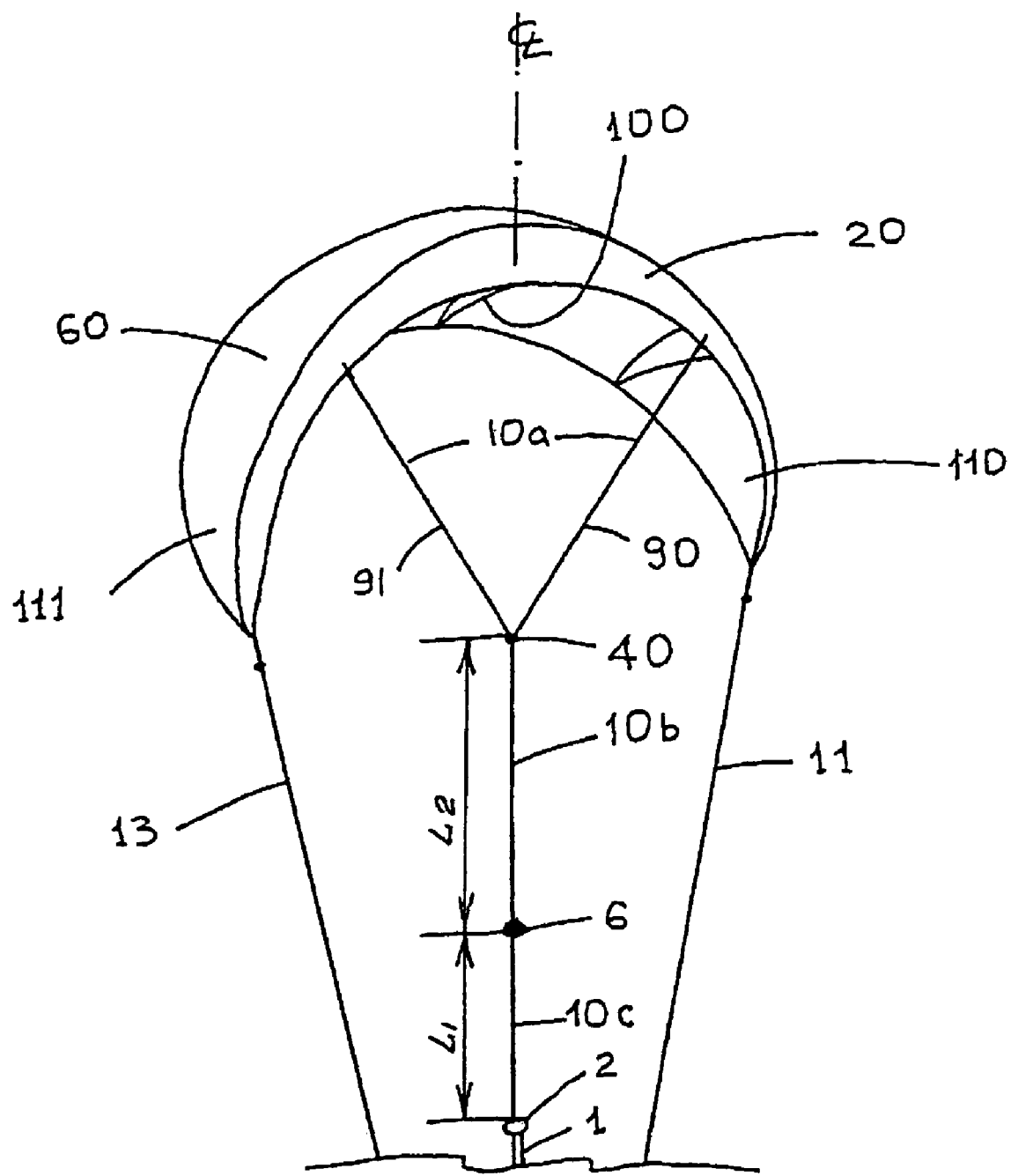
FIG._6

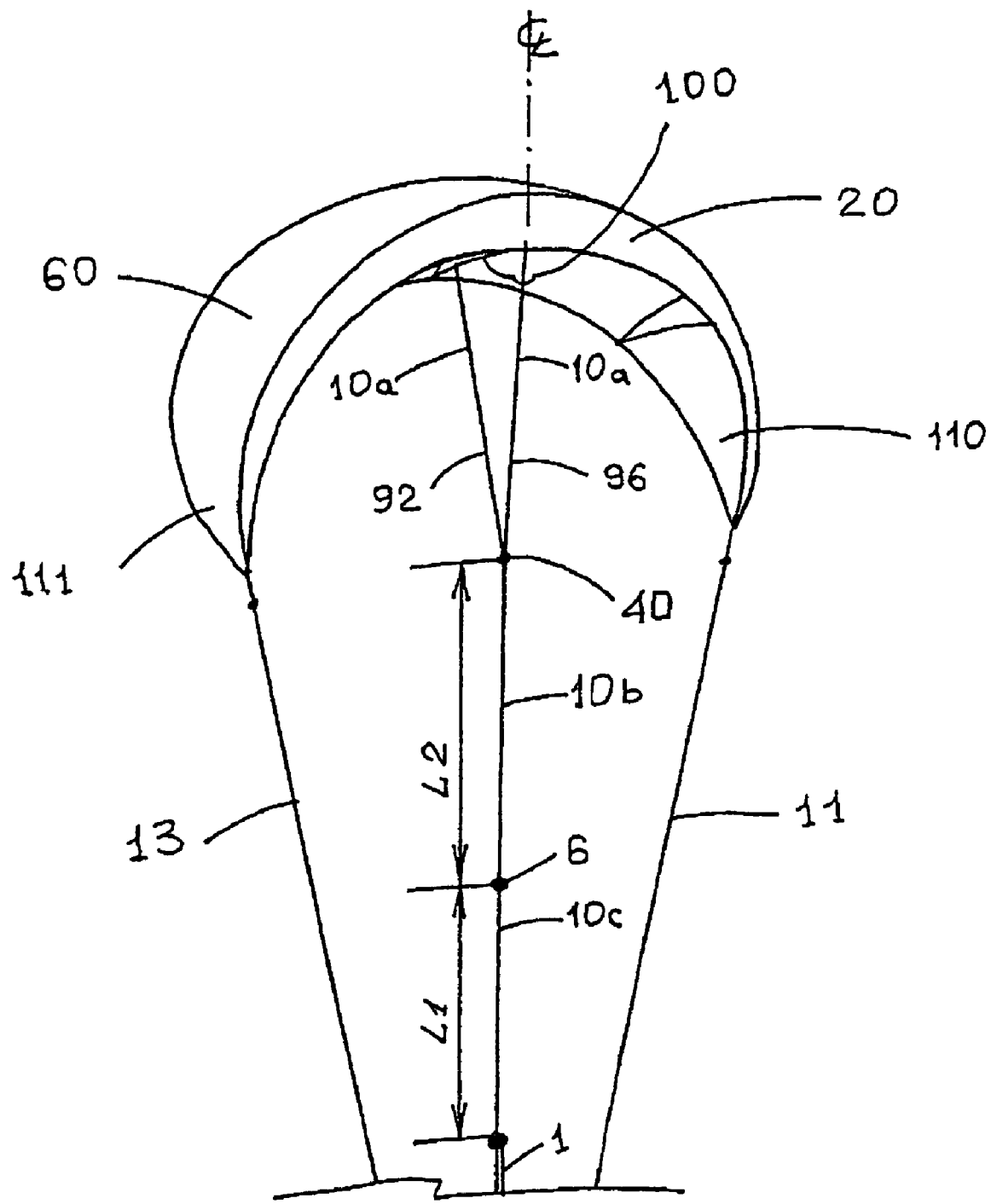
FIG._7

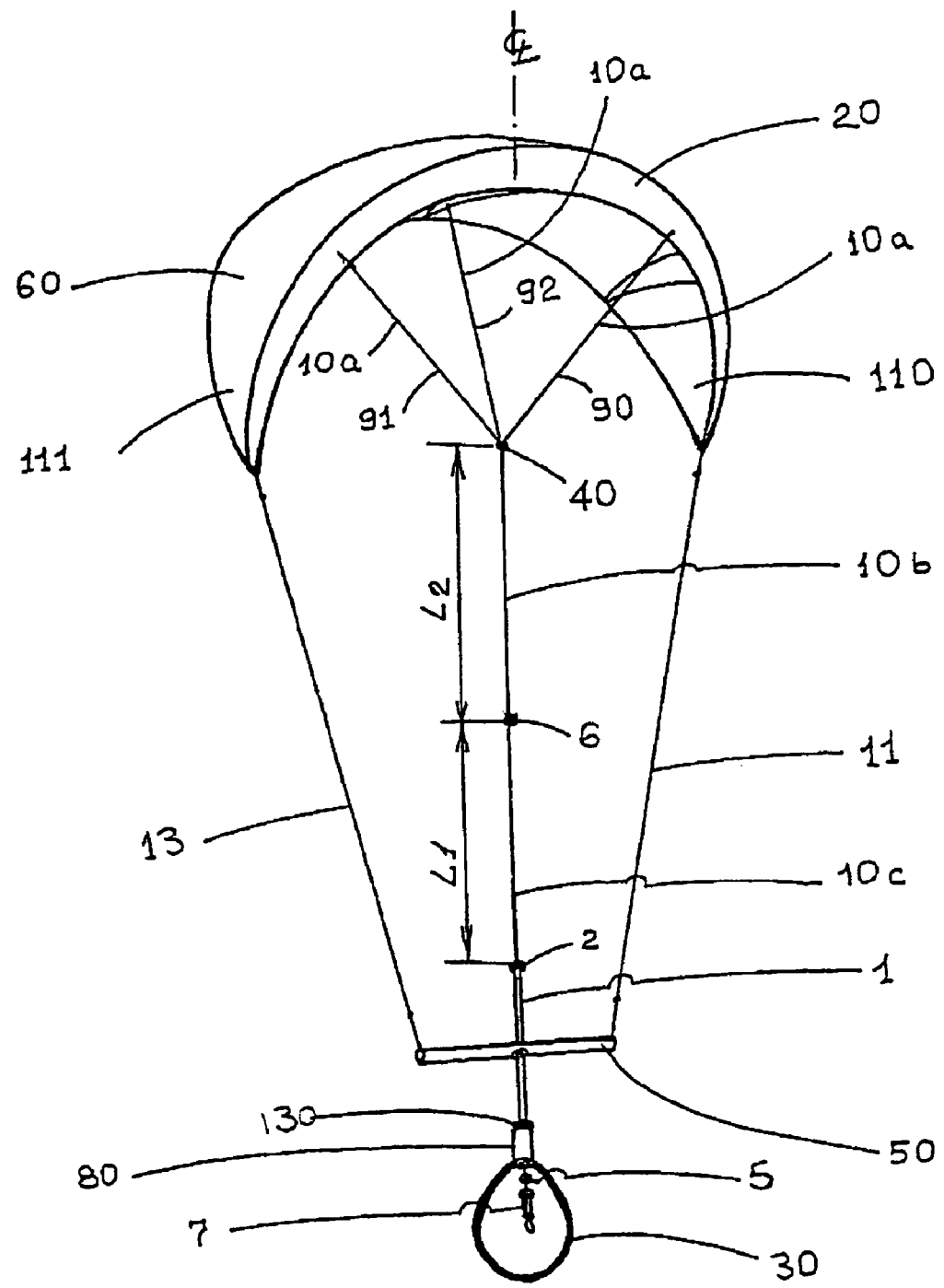
FIG._8

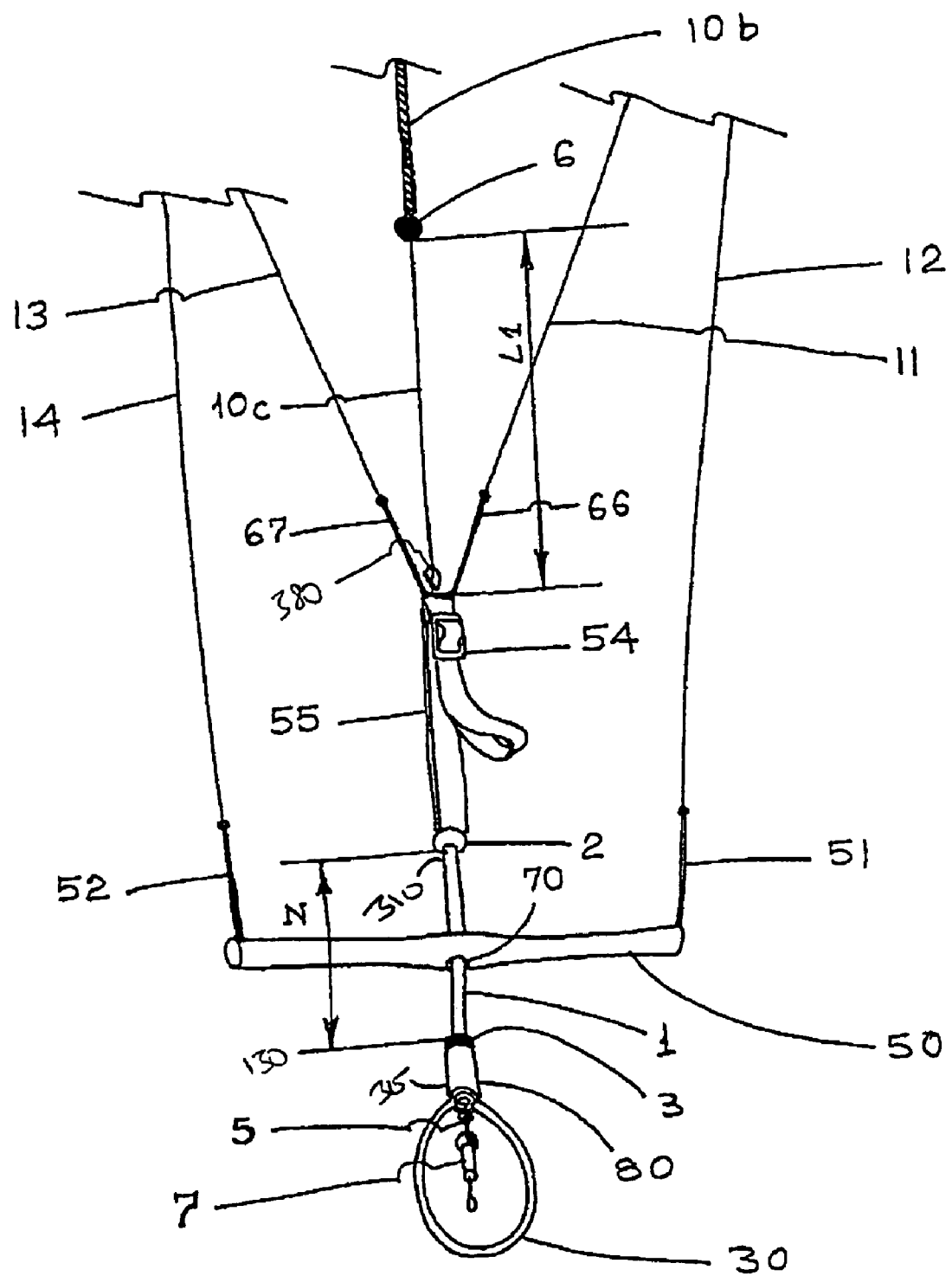
FIG._9

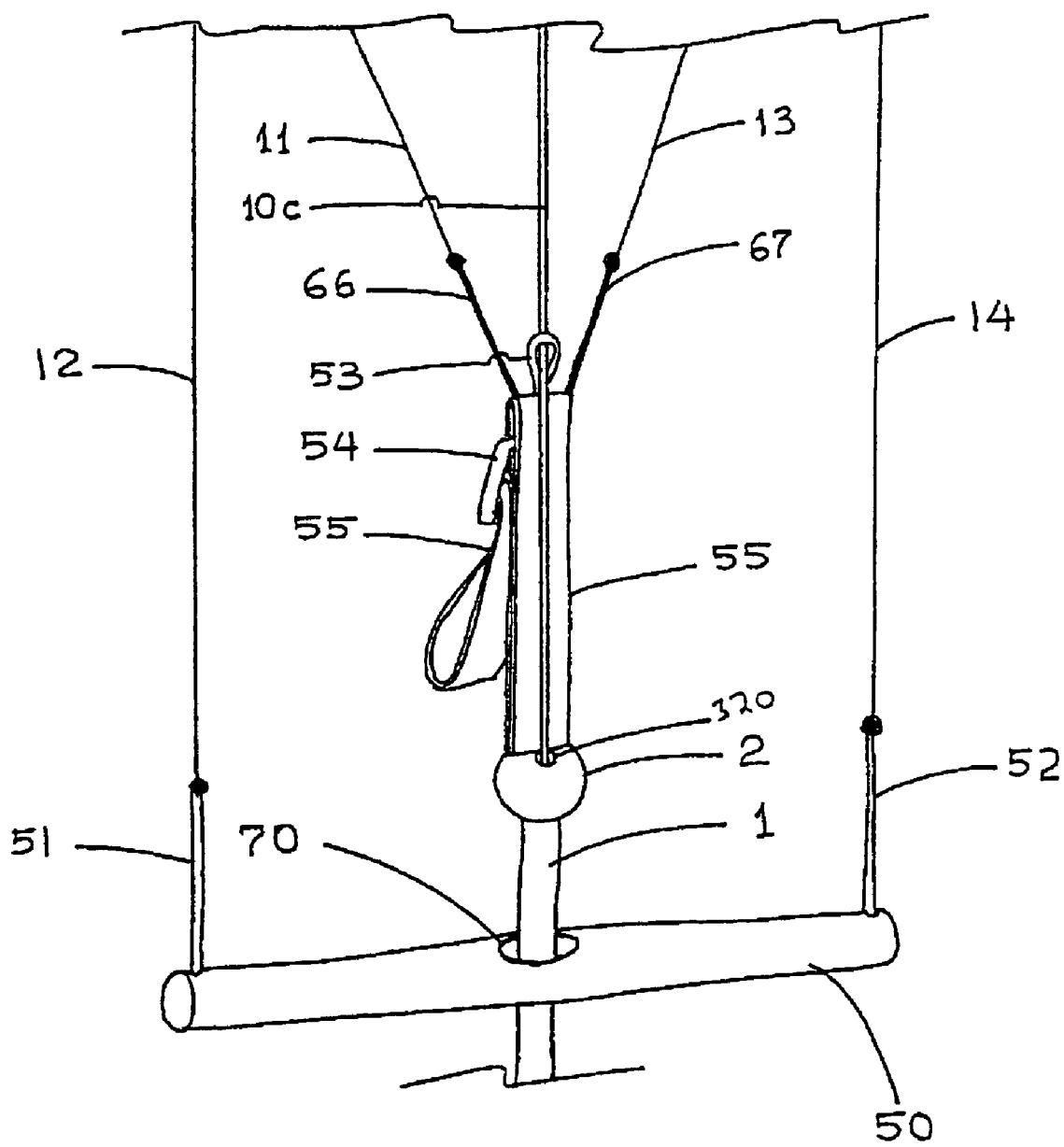
FIG. _10

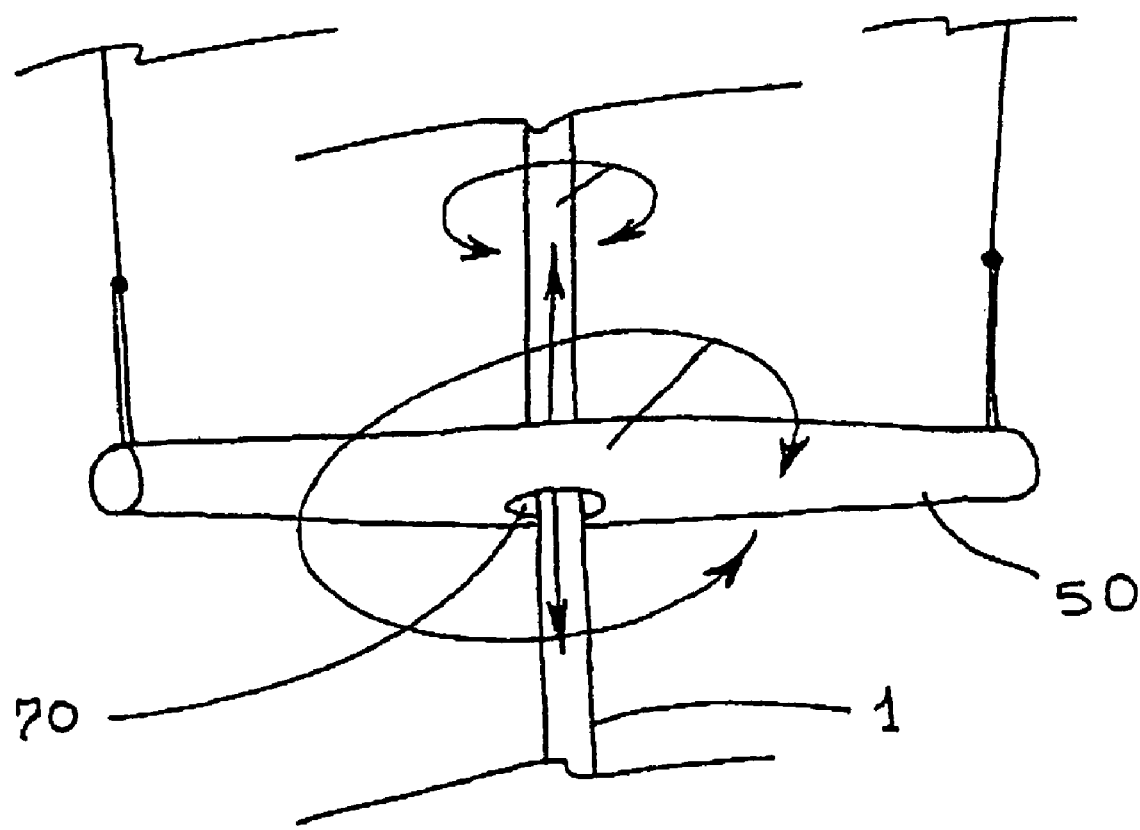
FIG._11

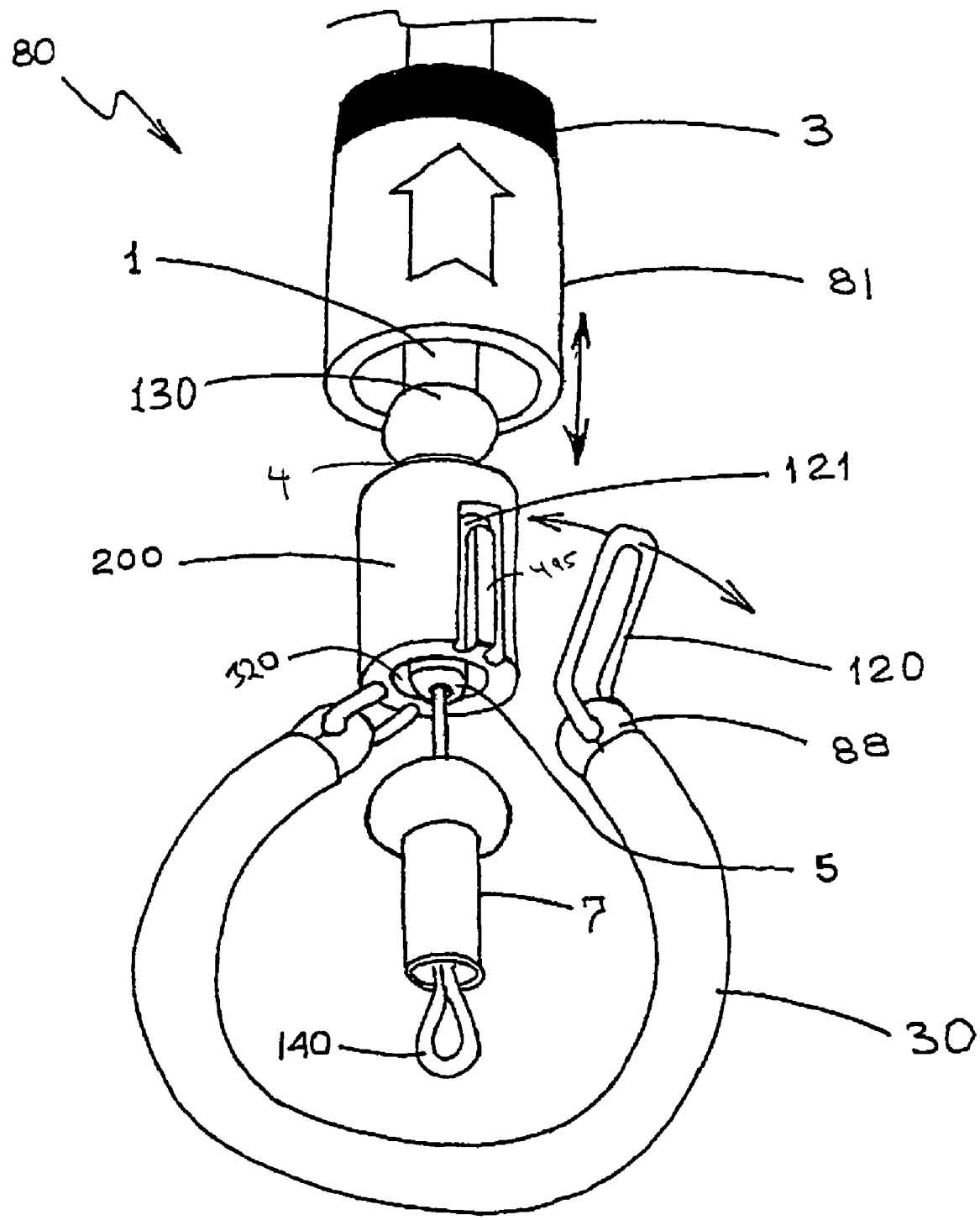
FIG._12

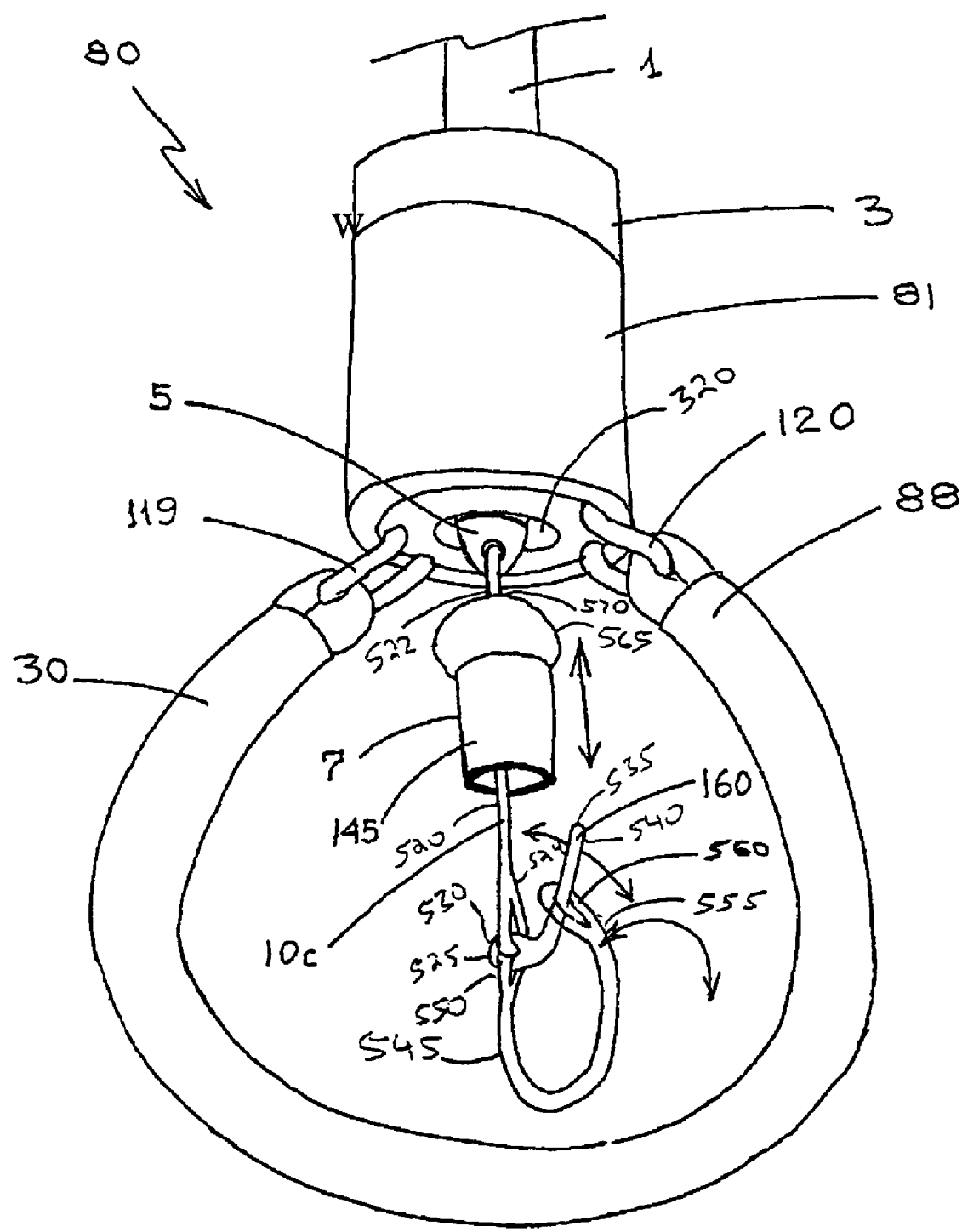
FIG._14

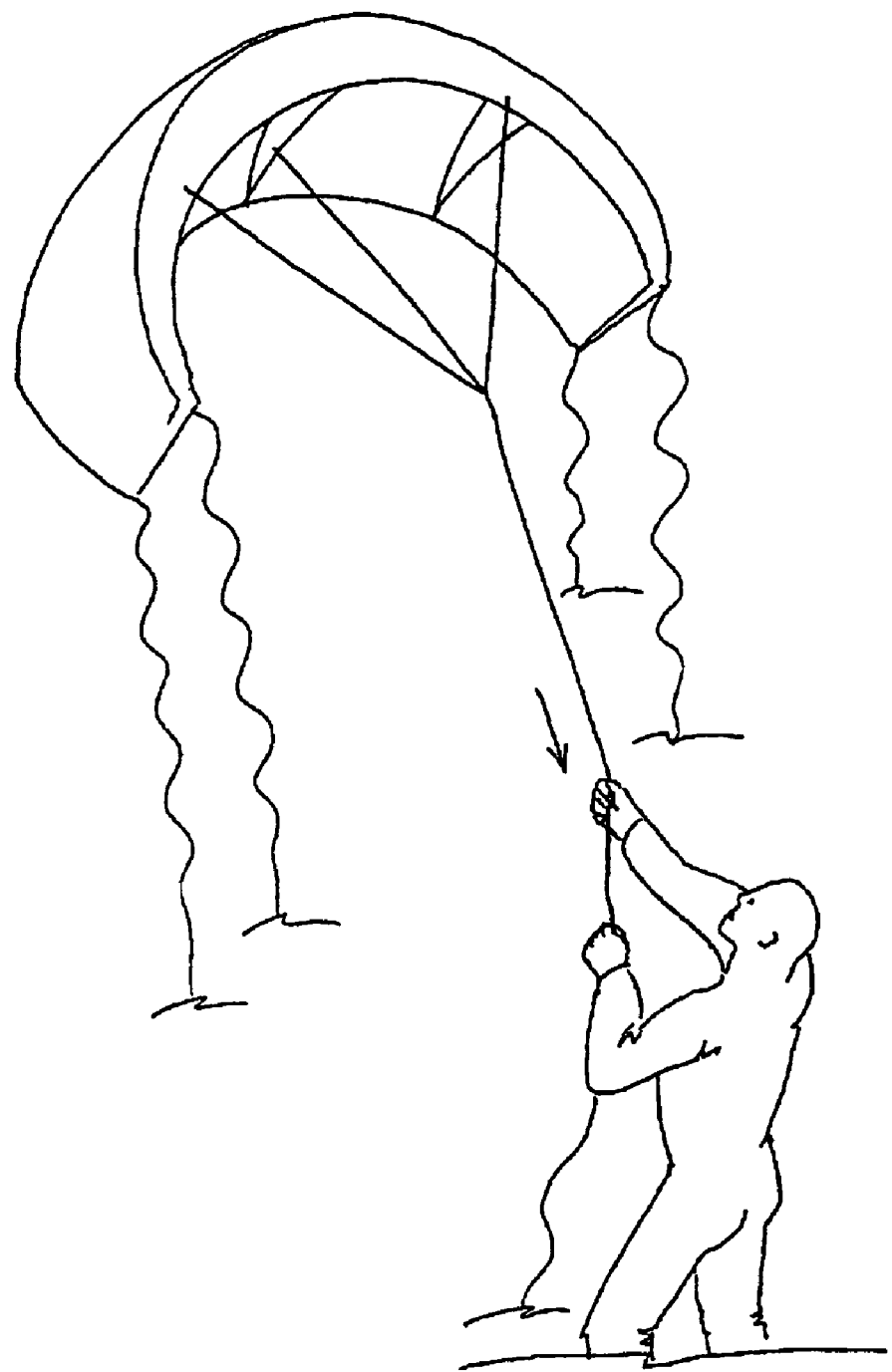
FIG._15

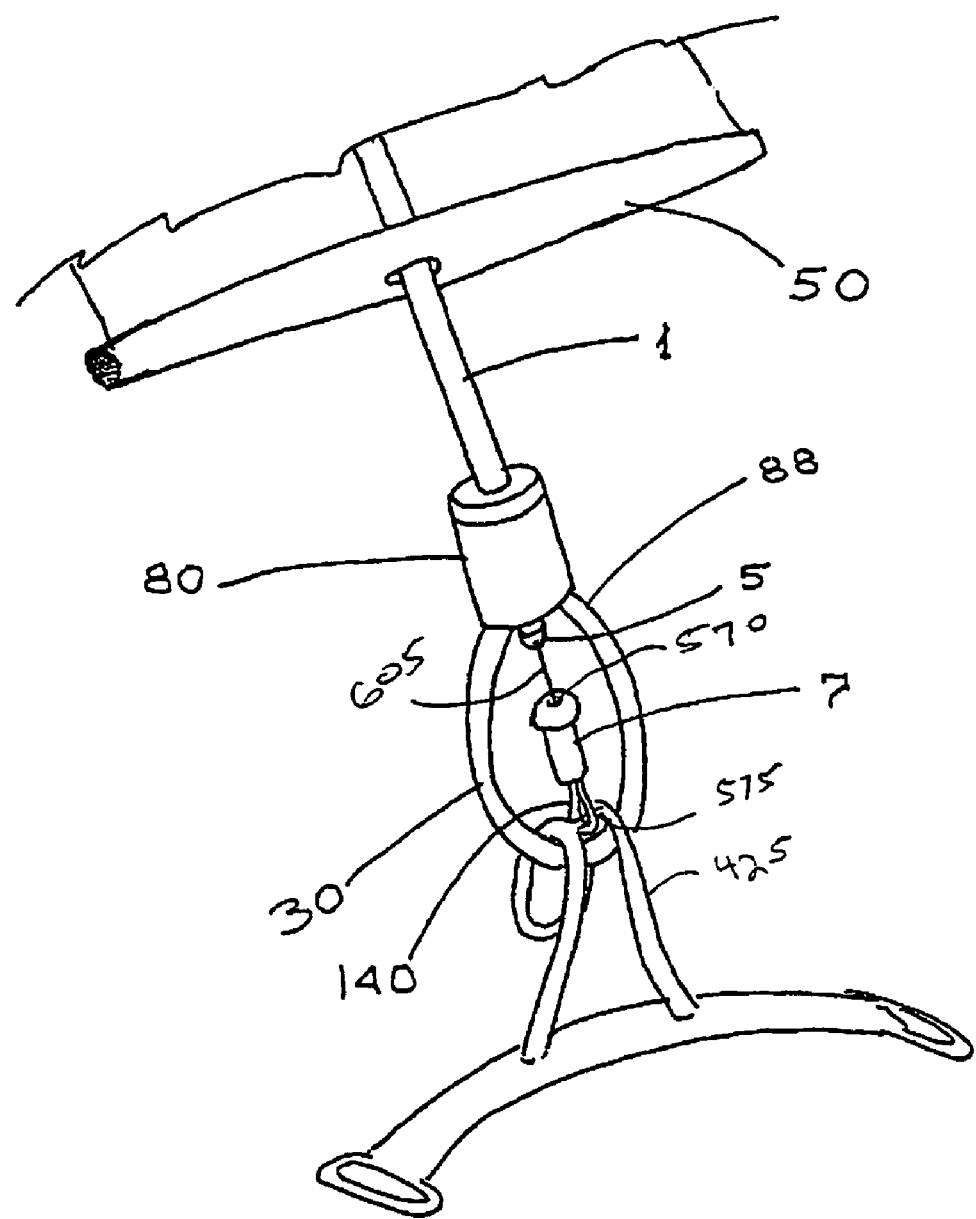
FIG._16

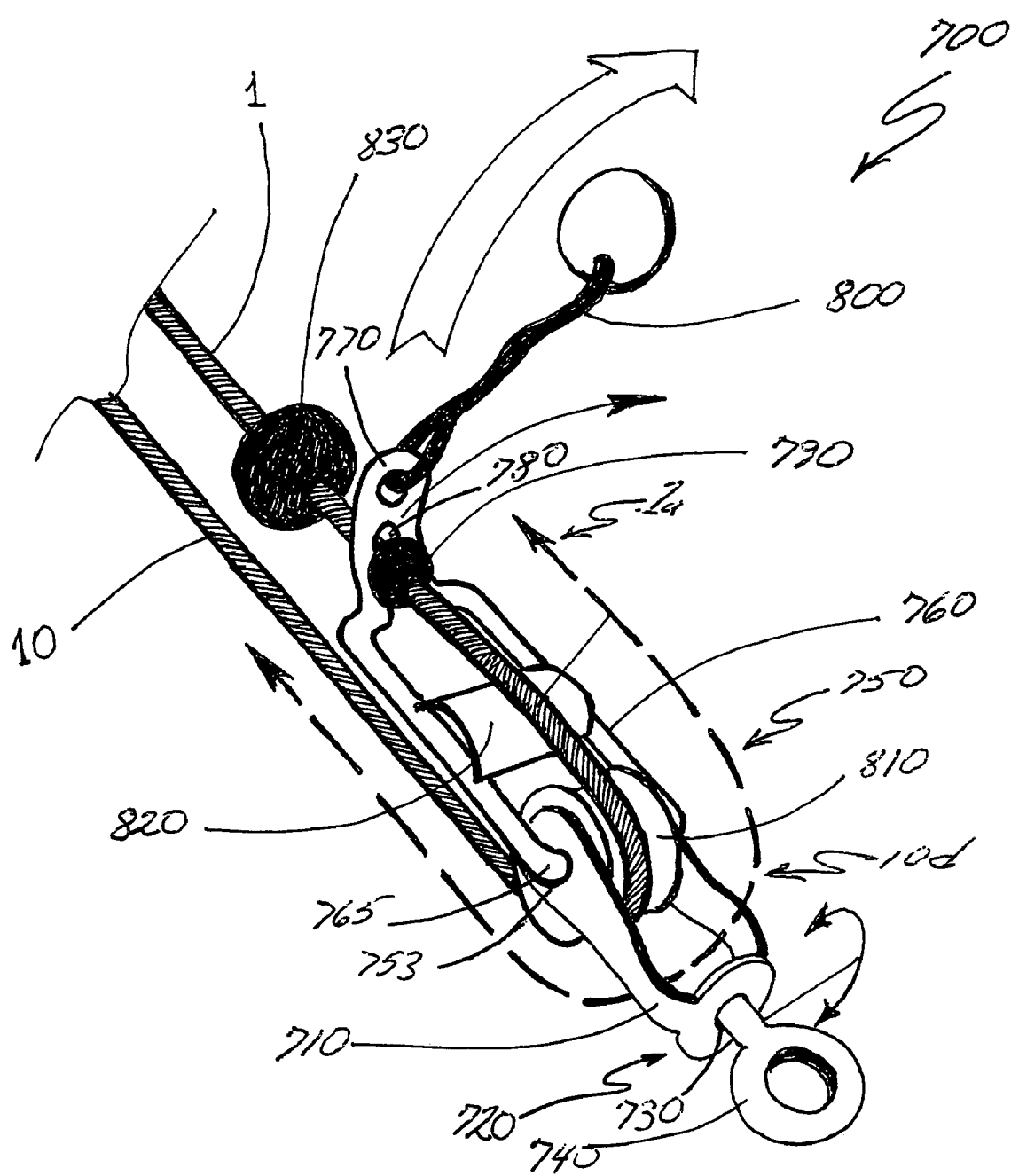
FIG._17

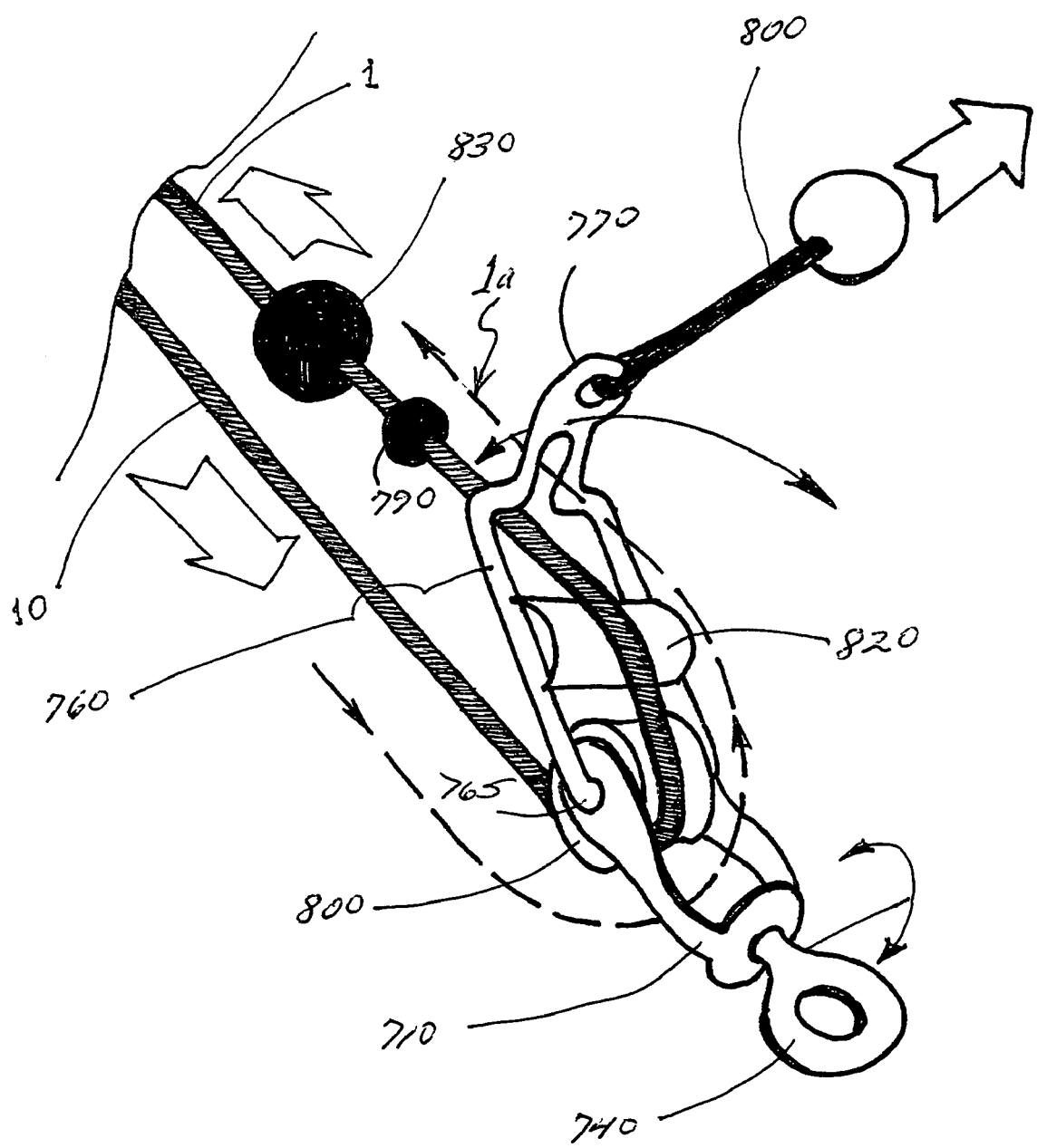
FIG._18

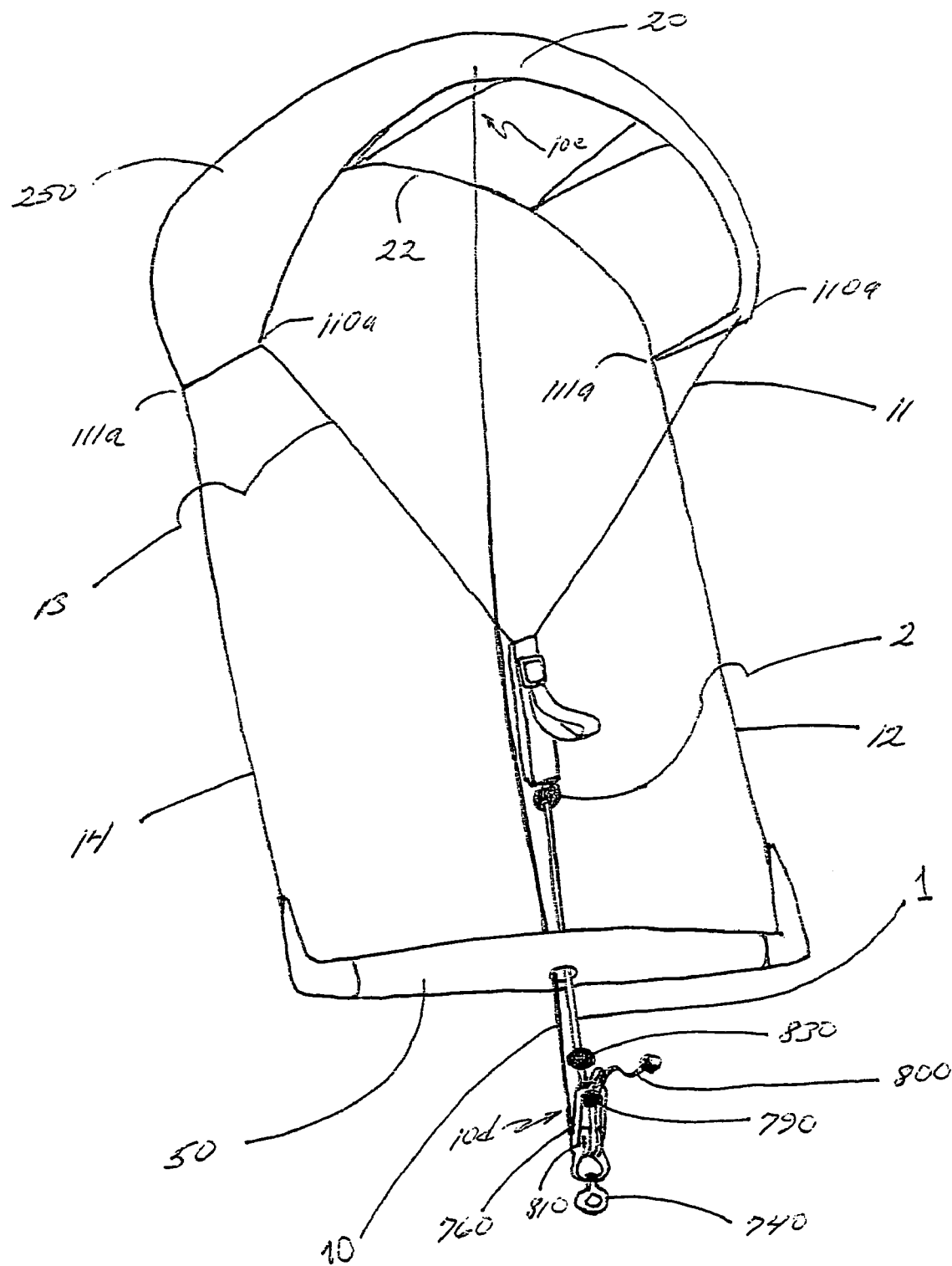
FIG._19

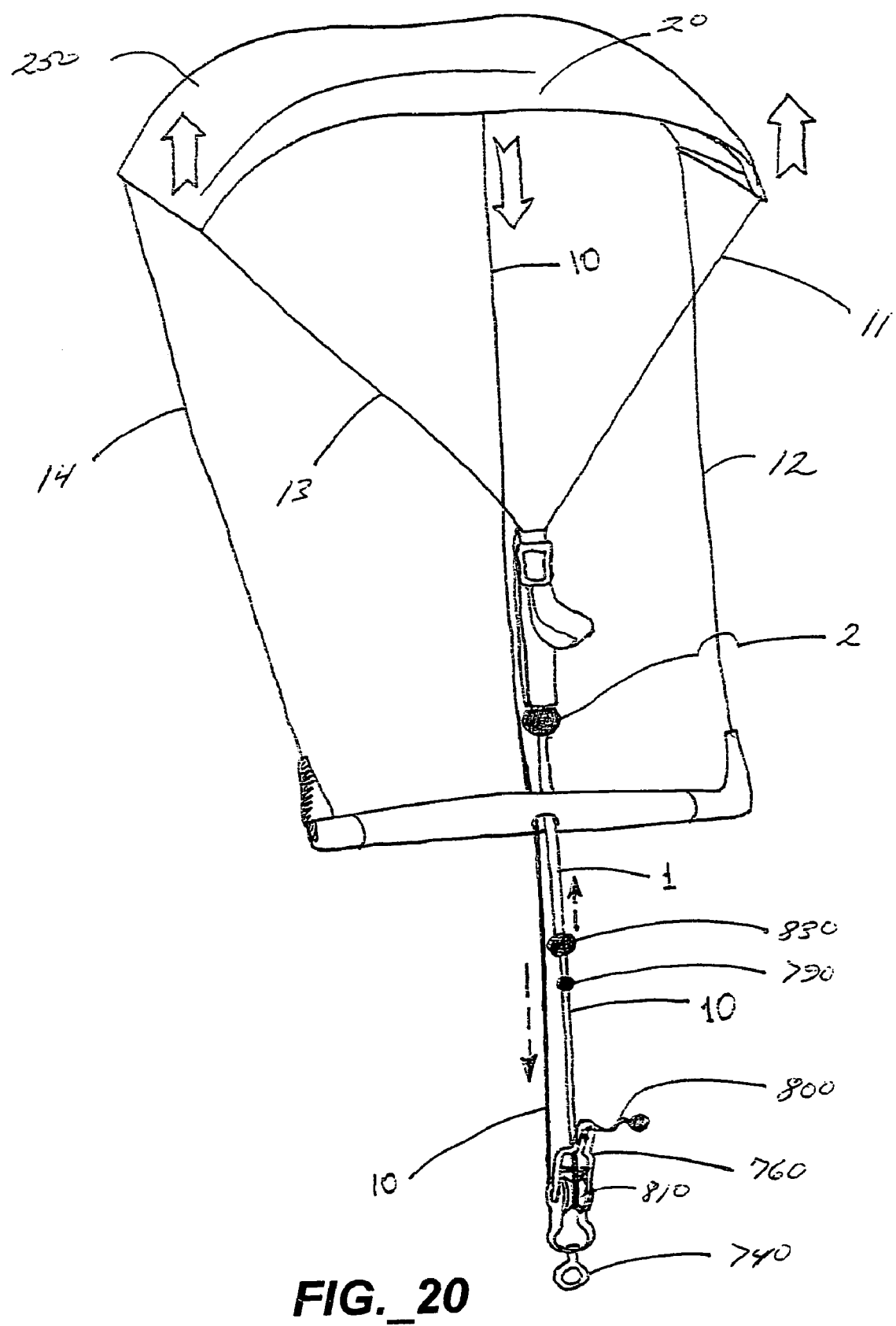
FIG._20

FIG._21A
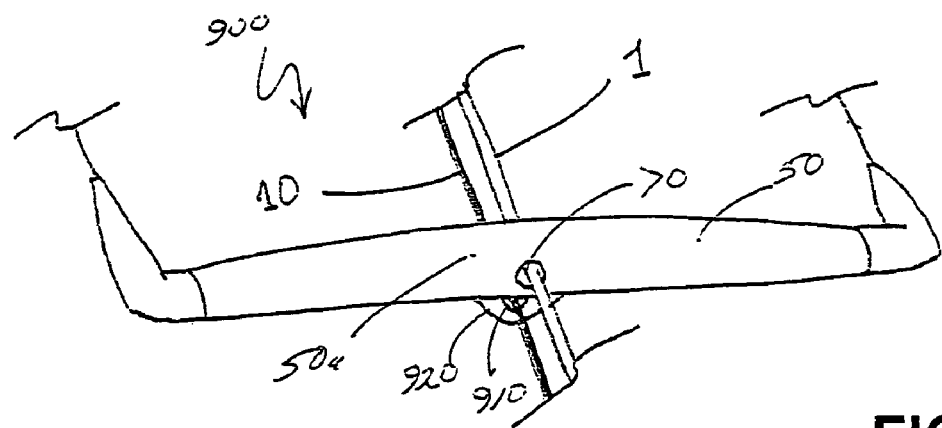
FIG._21B
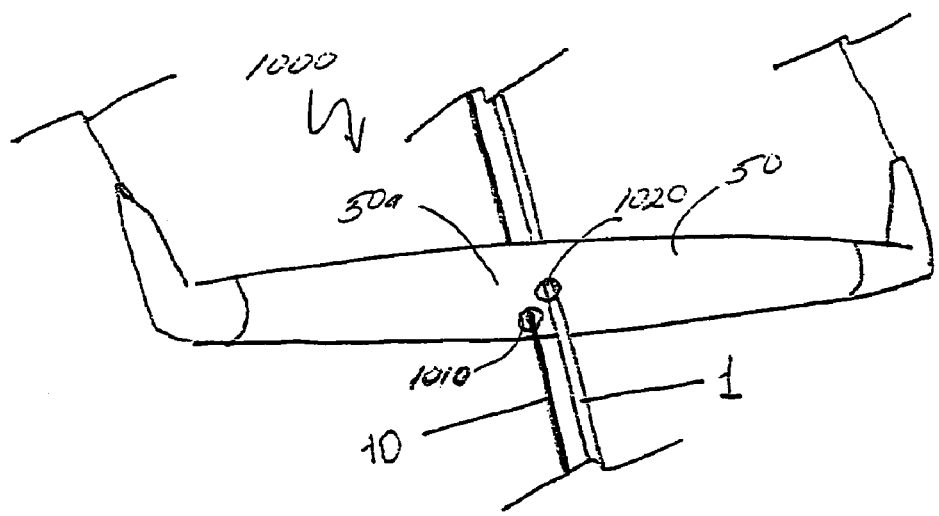
FIG._21C
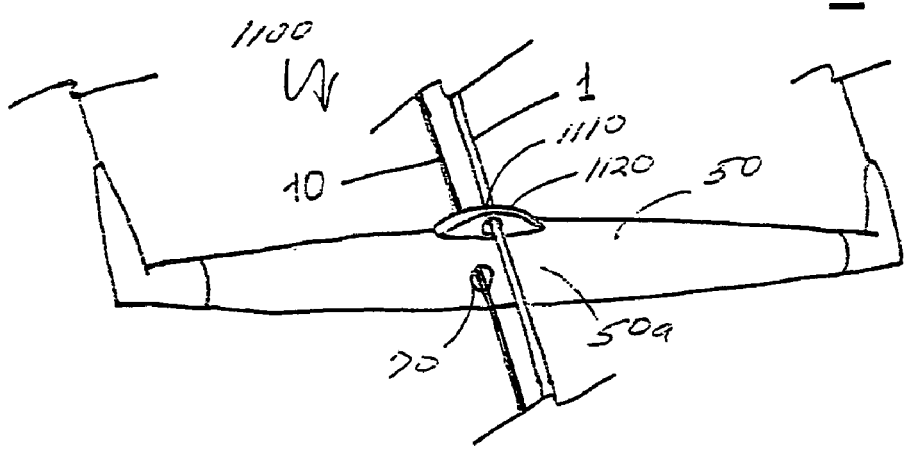

KITE SAFETY, CONTROL, AND RAPID DEPOWERING APPARATUS

CROSS REFERENCE TO RELATED APPLICATIONS

The present application is a continuation-in-part of U.S. Utility patent application Ser. No. 10/613,133, filed Jul. 3, 2003, pending, which claims priority from U.S. Provisional Patent Application Ser. No. 60/394,364, filed Jul. 3, 2002.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The invention pertains to equipment used in the sport of kite surfing and related activities involving kites having controllable airfoils. More particularly, the invention relates to a kite safety, control, and rapid depowering apparatus which selectively manages the control lines associated with such a kite, enabling the user to tightly and quickly adjust the angle of attack of the kite and to rapidly depower the kite to brake rapidly.

BACKGROUND INFORMATION AND DISCUSSION OF RELATED ART

The present invention relates to multiple line kites. Although the concept of kites has been around for centuries, kiting with multi-meter area kites, capable of lifting the user high into the air and attaining high speed, has become a popular sport in recent years. The most common design for this activity is with the use of a four line traction kite. Typically, the kite has a foil, stabilizing struts, a leading edge, two front lines attached to the front end corners of the kite and two back lines attached to the back end corners of the kite. The lower ends of the back control lines attach to the ends of the control flying bar, which is held by the user for controlling and manipulating the kite's speed and direction, while the lower ends of the front lines attach to a center line that may be attached directly to the control flying bar or to the user via a trim loop and a harness.

Several problems arose during the early use of such kites. One such problem is the need to quickly de-power the kite while still retaining control over it. One solution typically employed to accomplish this is a wrist safety leash, attached to the user's wrist or ankle on one end and at a point on one of the back lines on the other end. If users find themselves in an emergency situation, they can completely release the control bar, whereby the kite will de-power. The problem with the wrist safety leash is that it will cause the kite spin out of control and crash to the ground or water; the user will have no opportunity to regain control of the kite. Furthermore, once the kite is down, the lines of the kite are tangled up with the safety leash causing potentially several hours worth work untangling the lines.

Another set of solutions to the need for the need to quickly de-power the kite that are in practice is to allow the user to vary the lengths of the front and back lines while flying the kite. This is accomplished either through use of an adjustable center line strap connected to the front lines, or by allowing the control bar to slide freely over the center line, thereby increasing the effective length of the back lines. While these enabled the user to decrease the power of the kite and still maintain control, the user is limited by the range of motion of the control bar and the limited adjustability of the adjustable center line strap. Often users may find themselves in situations where the limited amount of de-powering provided by the above devices is insufficient and will have to release the control bar and rely on the safety leash.

Another problem is the tendency of the kite to rotate relative to the control bar during times when the kite is on the ground or water or if the user rotates the bar while performing stunts. One solution to this was the idea of having the front lines connect to a center line which passes through a hollow tube in the control bar and attaches directly to the user thereby allowing the back lines to be rotatably independent from the front lines. The problem with this approach is that although it is possible to untwist the back lines, the front lines still remain twisted.

Finally, when users need to land the kite, especially in moderate to strong wind conditions, it generally requires the assistance of a second person to catch the kite to keep the kite from becoming tangled and twisted. Without assistance, users would normally have to release the control bar and pull the kite in by the safety leash attached to one of the lines. As previously stated, this can cause the kite to lose control and its lines become tangled.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

Accordingly, it is an objective of the present invention to provide a device for safely and quickly de-powering a kite while continuing to maintain control. It is a still further objective of the invention to provide a way for a single user to land a kite unassisted and in a controlled manner so as to prevent the kite from crashing and keeping the lines untangled. It is yet a further objective to provide a device that will prevent the lines from becoming tangled while the kite is use. It is yet another objective to provide a means for increased control of the kite while it is being flown by the safety flying line. Finally, it is an objective of the invention to provide a way to quickly disconnect all loops from the user.

The kite safety, control, and depowering apparatus of the present invention may be fabricated for a kite having an airfoil with leading and trailing edges, at least two control lines attached to distal ends of the airfoil and a control flying bar attached to at least two of the control lines using the following components. A trim line is provided. The trim line has an upper end and a lower end and central passageway extending from the upper end to the lower end and is sized and shaped to fit slidably through a central opening in the control flying bar of a kite.

The trim line has a first stopper adjacent the upper end and a second stopper adjacent the lower end. The stoppers are sized and shaped to prevent the upper and lower ends of the trim line from passing through the central opening.

An upper swivel is provided. The upper swivel has a top portion and a bottom portion. Each of the top and bottom portions have a hollow central core, a first end and a second end. The top portion is attached at its first end to the lower end of the trim line. The bottom portion is rotatably attached at its first end to the second end of the top portion and attached at its second end to a trim line loop of the kite.

A safety flying line is provided. The flying line has first, second and third segments. The first segment has a first end and a second end and is attached at its first end to a first point adjacent a midpoint along a centerline extending from the leading edge to the trailing edge. The second segment has a first end and a second end. The second segment is attached at its first end to the second end of the first segment and has a third stopper attached adjacent its second end. The third stopper is sized and shaped to prevent the second end of the second segment from passing through a ring passage attached to an adjustable strap connected to the upper end of the trim line. The third segment has a first end and a second end and is attached at its first end to the second end of the second segment and attached at its second end to a first end of an upper portion of a lower swivel.

The upper portion of the lower swivel is rotatably mounted at a second end to a first end of a lower portion of the lower swivel. A second end of the lower portion of the lower swivel is attached to a fixture. The fixture provides a point for attachment of the flying line to a harness. When said control flying bar is released a user will be free to rotate beneath the kite and when tension is applied to the safety flying line, the kite will begin to stall and the kite will descend.

In a variant of the invention, the second segment of the safety flying line is formed of resilient material.

In a further variant, the second segment of the safety flying line is capable of elongating to include its original length plus a distance between the third stopper and the ring passage, thereby maintaining tension in said safety flying line.

In still a further variant, the third segment of the safety flying is formed of wear resistant material, thereby preventing breakage of said third segment due to friction with the central passageway.

In another variant of the invention, the first point is adjustably mounted along the center line, thereby altering performance of said kite when said safety flying line is employed.

In still another variant, the first end of the first segment of the safety flying line is divided into a front portion and a rear portion. The front portion attaches adjacent to the first point and the rear portion attaches at a second point on the center line behind the front portion.

In yet another variant, the length either of the front portion or the rear portion of the safety flying line is adjustable, thereby permitting stall characteristics of the kite as controlled by the safety flying line to be customized.

In still a further variant, the first end of the first segment of the safety flying line is divided into a first side portion and a second side portion. The first and second side portions attach adjacent to the second and third points spaced equidistantly from the centerline of the kite.

In another variant of the invention, the positions of the second and third points are adjustable along lines parallel to the centerline.

In still another variant, the positions of the second and third points are adjustable toward and away from the centerline.

In still a further variant, the first end of the first segment of the safety flying line is divided into a first side portion, a second side portion and a rear portion. The first and second side portions attach adjacent to the second and third points and are spaced equidistantly from the centerline of the kite. The rear portion attaches adjacent to the first point.

In yet a further variant of the invention, the positions of the first, second and third points are adjustable along lines parallel to the centerline.

In still a further variant, the positions of the second and third points are adjustable toward and away from said centerline.

In yet another variant, the upper swivel has a top portion fitted within and secured to the lower end of the trim line. The top portion includes a protruding first bearing surface. A bottom portion is provided that is formed as a cylinder and has a semi-enclosed upper end. The upper end has a central opening through it and a second mating bearing surface disposed around the central opening. The second mating bearing surface is sized and shaped to fit slidably upon the first bearing surface.

A bottom portion is provided that has a chamfered side opening and a central projecting member. A containing cover is provided. The cover has a semi-enclosed upper end. The upper end has a central opening through it. The central opening is sized and shaped to fit slidably over the trim line. The cover is sized and shaped to fit slidably over the upper swivel.

In yet a further variant, the first bearing surface and second mating bearing surface are shaped to accommodate either of ball and roller bearings and the upper swivel is a plurality of either of ball and roller bearings.

In another variant of the invention, the trim line loop is formed of resilient material and has a first end and a second end. The first end is attached to the bottom portion of the upper swivel. The second end has a loop fitting. The loop fitting is sized and shaped to fit over the projecting member and within the chamfered opening. When the loop fitting is placed within the chamfered opening over the projecting member and the containing cover is lowered over the upper swivel, the second end of the trim line loop will be secured to the bottom portion of the upper swivel.

In still another variant, the fixture providing a point for attachment of the flying line to a harness has a coupling cord. The cord has a first end and a second end and is attached at its first end to the lower portion of the second swivel. An L-shaped hook is provided. The hook has an orifice at a first end and an upward facing point at a second end and is attached to the second end of the coupling cord at the orifice.

A retaining lanyard is provided. The lanyard has a first end and a second end and is attached at the first end to either of the orifice and the coupling cord. The lanyard has a loop at the second end and is sized and shaped to fit slidably over the upward facing point of the L-shaped hook. A retaining cap is provided. The cap is sized and shaped to fit slidably over the L-shaped hook and has a semi-enclosed upper end. The upper end has a central opening through it and the opening is sized and shaped to fit slidably over the coupling cord. The cap is disposed upon the coupling cord above the L-shaped hook. When the lanyard is passed through a ring on a harness and the loop is fitted over the upward facing point forming a closed connection to the ring and the retaining cap is lowered over the L-shaped hook, the safety flying line will be rotatably and removably attached to the harness ring through the lower swivel.

In yet another variant of the invention a length of said safety flying line is adjustable, thereby providing a user with ability to control lift of said airfoil.

In still another variant of the invention, a kite safety device for a kite having an airfoil with leading and trailing edges, at least two control lines attached to distal ends of an airfoil and a control flying bar attached to at least two of the control lines may be fabricated from the following components. A trim line is provided. The trim line has an upper end and a lower end and central passageway extending from the upper end to the lower end and is sized and shaped to fit slidably through a central opening in the control flying bar of a kite.

A safety flying line is provided. The safety flying line has a first end and a second end and is attached at its first end to a first point adjacent a midpoint along a centerline extending from the leading edge to the trailing edge of the kite. The second end is attached to a fixture. The fixture provides a point for attachment of the flying line to a harness. When the control flying bar is released a user will be free to rotate beneath the kite and when tension is applied to the safety flying line, the kite will begin to stall and the kite will descend.

Another preferred embodiment of the kite safety, control, and depowering apparatus of the present invention includes a depowering device installed at the lower portion of the safety and trim lines, which converge and transition into one another through the depowering device. The depowering device provides means for the user to rapidly depower the kite for braking by almost instantaneously decreasing the angle of attack of the airfoil by releasing a simple lever. Rapid braking may be critical to stop safely or to avoid injury.

Finally, the present invention shows an number of configurations for routing trim and safety lines through the control flying bar, thus facilitating easy handling and manipulation of the kite control lines.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a perspective view of a four line kite with the kite safety device depicting the safety flying line, trim line, stoppers, a swivel, and control lines;

FIG. 1A is a perspective view showing a preferred routing of the safety flying line through the control flying bar guide hole;

FIG. 2 is a perspective view of the FIG. 1 embodiment illustrating a safety flying line having a first segment with two portions displaced fore and aft;

FIG. 3 is a perspective view of the FIG. 1 embodiment illustrating a safety flying line having a first segment with two portions displaced horizontally about the centerline of the kite;

FIG. 4 is a perspective view of the FIG. 1 embodiment illustrating a safety flying line having a first segment with two portions displaced horizontally about the centerline of the kite and a third portion displaced rearwardly along the centerline;

FIG. 5 is a perspective view of a two line kite with the kite safety device depicting the safety flying line and trim line;

FIG. 6 is a perspective view of the FIG. 5 embodiment illustrating a safety flying line having a first segment with two portions displaced horizontally about the centerline of the kite;

FIG. 7 is a perspective view of the FIG. 5 embodiment illustrating a safety flying line having a first segment with two portions displaced fore and aft;

FIG. 8 is a perspective view of the FIG. 5 embodiment illustrating a safety flying line having a first segment with two portions displaced horizontally about the centerline of the kite and a third portion displaced rearwardly along the centerline;

FIG. 9 is a detailed front view of the FIG. 1 embodiment illustrating the safety flying line, trim line, upper swivel, lower swivel, control lines, control flying bar, trim line loop, and fixture;

FIG. 10 is a detailed back view of the FIG. 1 embodiment depicting the safety flying line, trim line, ring passage and the control flying bar;

FIG. 11 is an detailed front view of the FIG. 1 embodiment illustrating the control flying bar, the trim line and central opening in the control flying bar illustrating relative motions of the control flying bar and trim line;

FIG. 12 is an detailed front view illustrating the safety flying line, trim line loop, second stopper, upper swivel, lower swivel, loop fitting, projecting member, chamfered opening and containing cover;

FIG. 14 is an detailed front view illustrating the safety flying line, trim line loop, stopper, lower swivel, upper swivel, fixture, coupling cord, retaining lanyard, L-shaped hook, and retaining cap;

FIG. 15 is a perspective view illustrating operation of the kite by the safety flying line;

FIG. 16 is a detailed perspective view illustrating attachment of the trim line loop and the safety flying line to a harness;

FIG. 17 is a schematic perspective view of a rapid depowering device adapted for use with the kite safety apparatus of the present invention, showing the depowering device installed on a kite with four control lines and in the closed and locked position;

FIG. 18 is a schematic perspective view showing the effect on the kite's angle of attack when the depowering device is released into its open and unlocked position;

FIG. 19 is a perspective view showing the depowering device installed on a kite and in the locked position;

FIG. 20 is a perspective view showing the depowering device having been opened to depower the kite;

FIGS. 21A–C are perspective views showing various possible configurations of guide holes for routing the trim and safety lines from the harness connection through the control flying bar to the kite;

DRAWING REFERENCE NUMERALS

Figure 13:
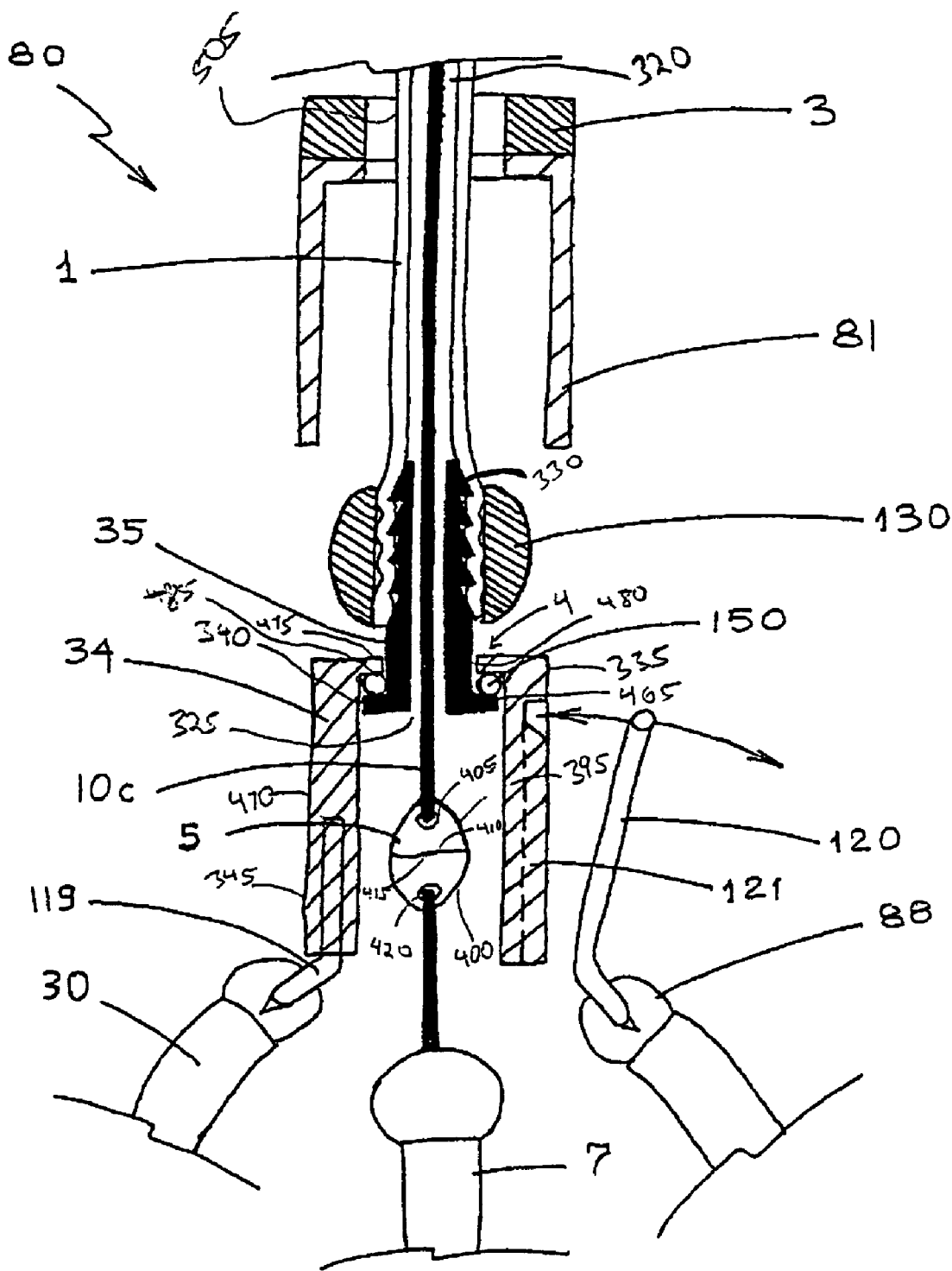
FIG. 13 is a detailed cross-sectional front view illustrating the safety flying line, trim line, trim line loop, second stopper, upper swivel, lower swivel, loop fitting, projecting member, chamfered opening and containing cover.

FIGS. 1–16
1 trim line
1a lower portion of trim line
2 first stopper of trim line
3 upper end of containing cover 81
4 upper swivel
5 lower swivel
6 third stopper attached adjacent second end of safety flying line
7 retaining cap
10 safety flying line
10a first segment of safety flying line
10b second segment of safety flying line
10c third segment of safety flying line
11 control line
12 control line
13 control line
14 control line
20 leading edge of airfoil
22 trailing edge of airfoil
30 trim line loop of kite
34 bottom portion of upper swivel
35 top portion of upper swivel
50 control flying bar
55 adjustable strap connected to upper end of trim line
60 airfoil
70 central opening (line guide hole) in control flying bar
81 containing cover
88 second end of trim line loop 30
90 first side portion of first end of first segment of safety flying line
91 second side portion of first end of first segment of safety flying line
92 rear portion of first end of first segment of safety flying line
96 front portion of first end of first segment of safety flying line
101 centerline extending from the leading edge to the trailing edge of airfoil
110 distal end of airfoil
110a distal end of leading edge of airfoil
111 distal end of airfoil
111a distal end of trailing edge of airfoil
119 first end of trim line loop 30
120 loop fitting on second end 88 of trim line loop 30
121 chamfered side opening of bottom portion 470
130 second stopper of trim line
140 fixture
150 ball and roller bearings
160 hook
210 harness hook
220 harness bar
250 kite
305 kite safety device
310 upper end of trim line
315 lower end of trim line
320 central passageway of trim line
325 hollow central core of top and bottom portions of upper swivel
330 first end of top portion of upper swivel
340 second end of top portion of upper swivel
340 first end of bottom portion of upper swivel
345 second end of bottom portion of upper swivel
350 first end of first segment of safety flying line
355 second end of first segment of safety flying line
360 first point (attachment point for first end of first segment of safety flying line)
365 midpoint
370 first end of second segment of safety flying line
375 second end of second segment of safety flying line
380 ring passage
385 first end of third segment of safety flying line
390 second end of third segment of safety flying line
395 upper portion of lower swivel
400 lower portion of lower swivel
405 first end of upper portion of lower swivel 5
410 second end of upper portion of lower swivel
415 first end of lower portion of lower swivel
420 second end of lower portion of lower swivel
425 harness
430 distance between third stopper 6 and ring passage 380

Figure 22:
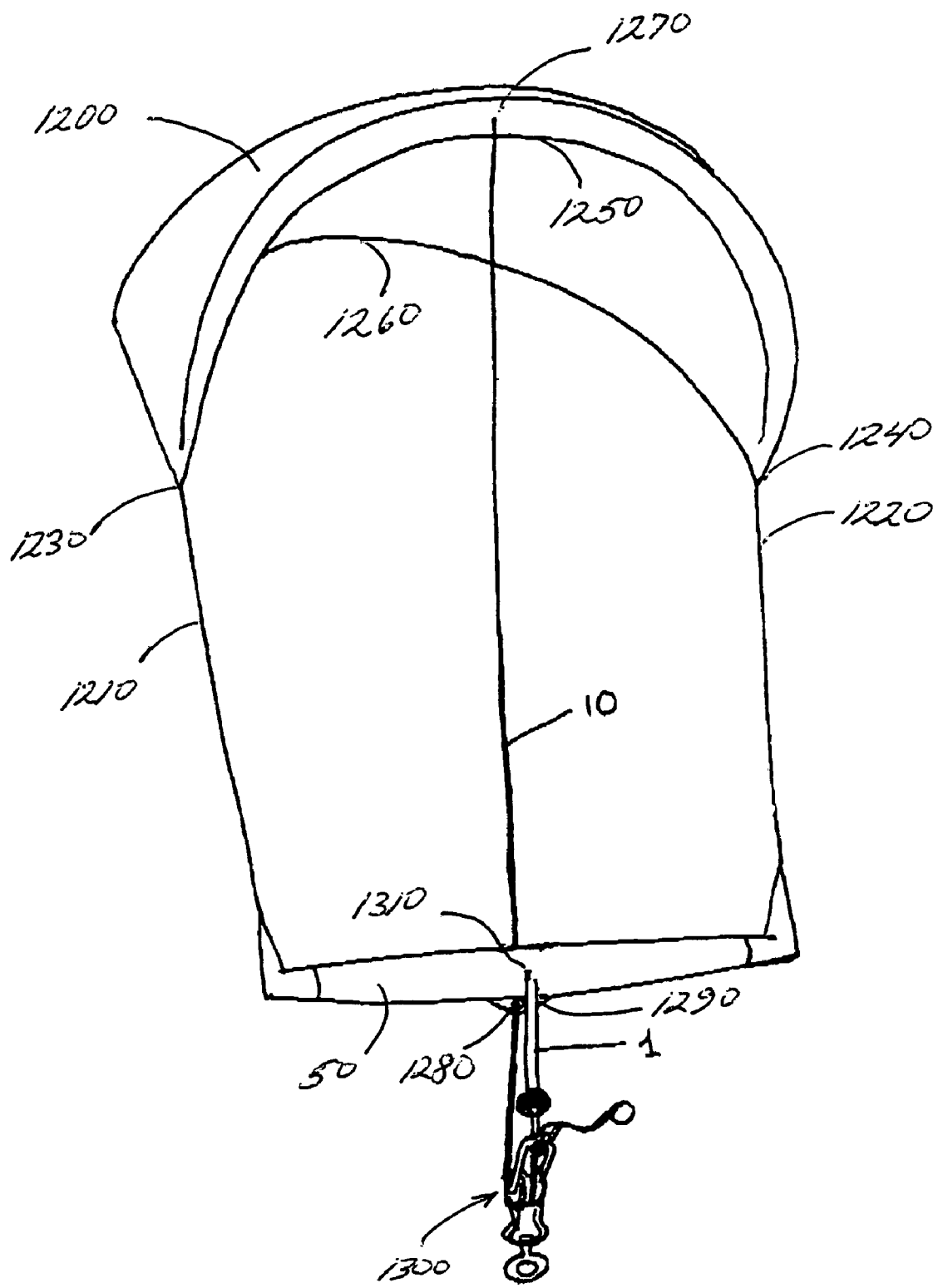
FIG. 22 is a schematic perspective view showing the rapid depowering device installed on a kite having two control lines and in the locked and closed position.
Figure 23:
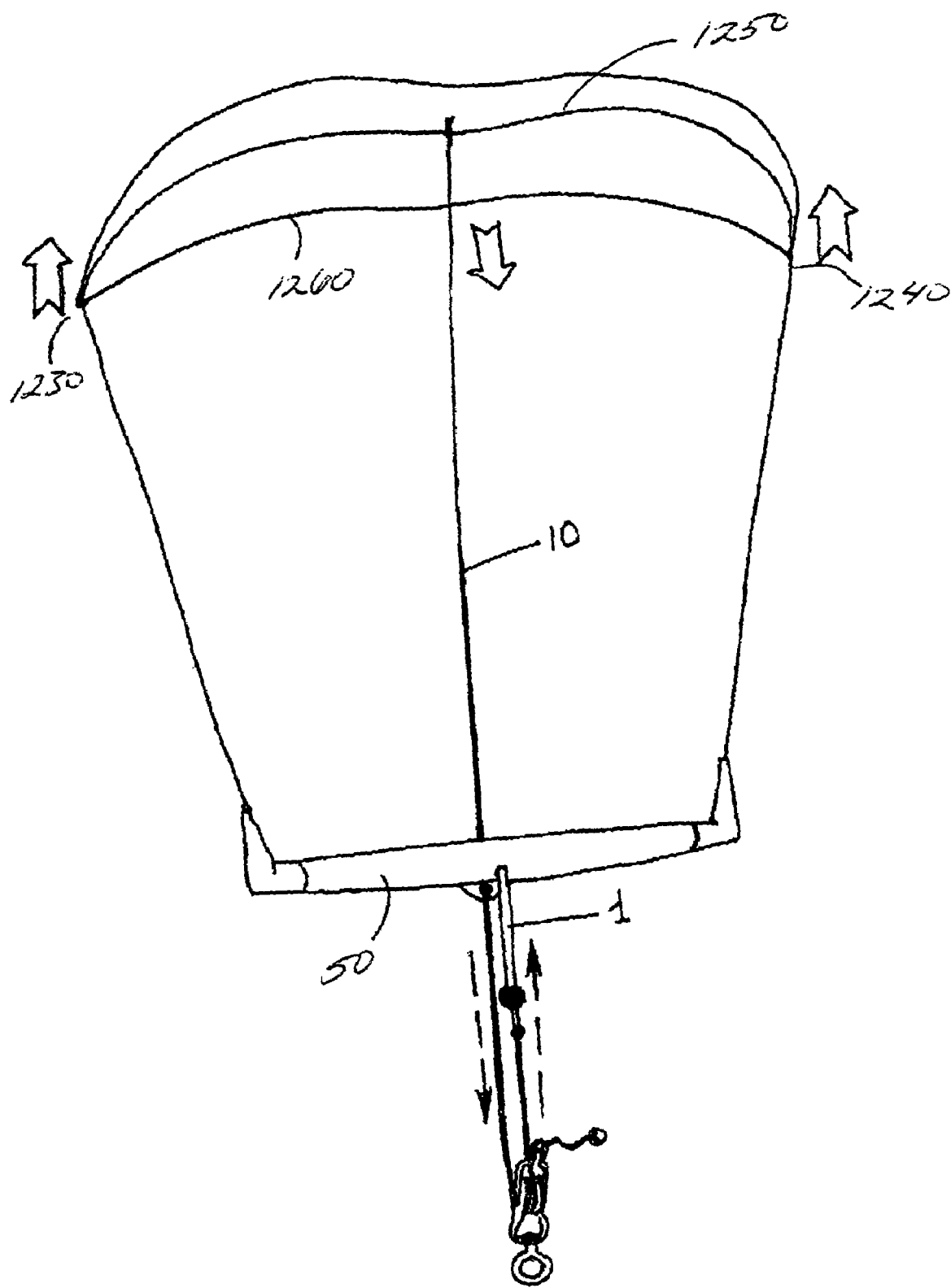
FIG. 23 is a schematic perspective view showing the effect on the kite of FIG. 22 when the depowering device is released into its open and unlocked position.

435 original length of second segment of safety flying line
440 second point (attachment point for rear portion 92)
445 third point (attachment point for second side portion 91
450 second point (attachment point for first side portion 90
455 line parallel to the centerline 101 along which second point 450 is adjustable
460 line parallel to centerline 101 along which third point 445 is adjustable
465 first bearing surface of top portion of upper swivel
470 exterior surface of bottom portion 34 of upper swivel 5
475 semi-enclosed upper end of bottom portion of upper swivel
480 central opening of upper end 475
485 second mating bearing surface disposed around the central opening 480
495 central projecting member of bottom portion 470
505 central opening through upper end 3
520 coupling cord for fixture 140
522 first end 522 of coupling cord
524 second end of coupling cord
525 orifice in hook 160
530 first end of hook 160
535 upward facing point of hook 160
540 second end of hook 160
545 retaining lanyard
550 first end of lanyard
555 second end of lanyard
560 loop at second end of lanyard
565 upper end of retaining cap 7
570 central opening in upper end of retaining cap
575 ring on harness 425
600 first end of safety flying line
605 second end of safety flying line
  FIGS. 17–20
1a lower portion of trim line
10d lower portion of safety flying line
10e lower portion of safety flying line
700 rapid depowering device
710 base bracket
720 bracket lower end
730 hole
740 swiveling eye hook
750 bracket upper end
753 through hole
757 through hole
760 pivoting quick release lever
765 axle
770 bend
780 notch
790 retention ball
800 quick release pull cord
810 pulley
820 tensioning saddle
830 pull ball
900 first alternative trim line guide hole configuration
910 hole
920 tab
1000 second alternative trim line guide hole configuration
1010 guide hole
1020 guide hole
1100 third alternative trim line guide hole configuration
1110 opening
1120 tab
  FIGS. 22–23
1 trim line
10 safety flying line
1200 kite
1210 first control line
1220 second control line
1230 distal end of airfoil
1240 distal end of airfoil
1250 leading edge of airfoil
1260 trailing edge of airfoil
1270 safety flying line connection point
1280 guide hole
1290 auxiliary tab
1300 depowering device (in locked position)
1310 trim line connection point
1320 depowering device in open and unlocked position

DETAILED DESCRIPTION OF THE INVENTION

FIGS. 1–16 illustrate a kite safety device 305 for a kite 250 that has an airfoil 60 with leading 20 and trailing 22 edges, with at least two control lines, e.g., first control line 11, second control line 12, third control line 13, and fourth control line 14, attached to distal ends 110, 111 of the airfoil 60 and a control flying bar 50 attached to at least two of the control lines 11, 12, 13, 14. The safety device 305 has a trim line 1. The trim line 1 has an upper end 310 and a lower end 315 and central passageway 320 (FIG. 10) extending from the upper end 310 to the lower end 315 and is sized and shaped to fit slidably through a central opening (trim line guide hole) 70 in the control flying bar 50 of a kite.

The trim line 1 has a first stopper 2 adjacent the upper end 310 and a second stopper 130 adjacent the lower end. The stoppers 2, 130 are sized and shaped to prevent the upper 310 and lower 315 ends of the trim line 1 from passing through the central opening 70.

As shown in FIGS. 12 and 13, a trim line safety swivel assembly 80 is provided. The trim line safety swivel assembly includes an upper swivel 4 having a top portion 35 and a bottom portion 34. The 35 portion and bottom 34 each have a hollow central core 325 coaxially disposed relative to one another, a first end 330, 335 and a second end 340, 345. The top portion 35 is attached at its first end 330 to the lower end 315 of the trim line 1. The bottom portion 34 is rotatably attached at its first end 335 to the second end 340 of the top portion 35 and attached at its second end 345 to a trim line loop 30 of the kite 250.

Referring to FIGS. 1–9 and 13, a safety flying line 10 (also referred to as a 5$^{th}$ line) is provided. The safety flying line 10 has first 10a, second 10b and third 10c segments. The first segment 10a has a first end 350 and a second end 355 and is attached at its first end 350 to a first point 360 adjacent a midpoint 365 along a centerline 101 extending from the leading edge 20 to the trailing edge 22. The second segment 10b has a first end 370 and a second end 375. The second segment 10b is attached at its first end 370 to the second end 375 of the first segment 10a and has a third stopper 6 attached adjacent its second end 375. The third stopper 6 is sized and shaped to prevent the second end 375 of the second segment 10b from passing through a ring passage 380 attached to an adjustable strap 55 connected to the upper end 310 of the trim line 1. The third segment 10c has a first end 385 and a second end 390 and is attached at its first end 385 to the second end 375 of the second segment 10b and attached at its second end 390 to a first end 405 of an upper portion 395 of a lower swivel 5.

The upper portion 395 of the lower swivel 5 is rotatably mounted at a second end 410 to a first end 415 of a lower portion 400 of the lower swivel 5. A second end 420 of the lower portion 400 of the lower swivel 5 is attached to a fixture 140. The fixture 140 provides a point for attachment of the safety flying line 10 to a harness 425. When said control flying bar 50 is released a user will be free to rotate beneath the kite 250 and when tension is applied to the safety flying line 10, the kite 250 will begin to stall and the kite 250 will descend.

In a variant of the invention, the second segment 10b of the safety flying line 10 is formed of resilient material.

In another variant, referring to FIG. 1, the second segment 10b of the safety flying line 10 is capable of elongating to include its original length 435 plus a distance 430 between the third stopper 6 and the ring passage 380, thereby maintaining tension in said safety flying line 10.

In still another variant, the third segment 10c of the safety flying line 10 is formed of wear resistant material, thereby preventing breakage of said third segment 10c due to friction with the passageway 320.

FIG. 1A shows an alternative preferred embodiment in which the safety flying line 10 is routed not through passageway 320, but rather runs side-by-side with the trim line 1 and feeds through line guide hole 70 in the control flying bar 50, below which it hooks onto a harness hook 210 which is affixed to a harness bar 220. In this configuration friction between the lines is reduced.

In yet another variant, as shown in FIGS. 1, 2, 5, and 7, the first point 360 is adjustably mounted along the center line 101, thereby altering performance of said kite 250 when said safety flying line 10 is employed.

In another variant of the invention, as shown in FIG. 2, the first end 350 of the first segment 10a of the safety flying line 10 is divided into a front portion 96 and a rear portion 92. The front portion 96 attaches adjacent to the first point 360 and the rear portion 92 attaches at a second point 440 on the center line 101 behind the front portion 96.

In a further variant, the length either of the front portion 96 or the rear portion 92 of the safety flying line 10 is adjustable, thereby permitting stall characteristics of the kite 250 as controlled by the safety flying line 10 to be customized.

In still a further variant, as shown in FIGS. 1 and 3, the first end 350 of the first segment 10a of the safety flying line 10 is divided into a first side portion 90 and a second side portion 91. The first 90 and second side portions 91 attach adjacent to second 450 and third 445 points spaced equidistantly from the centerline 101 of the kite 250.

In yet another variant, the positions of the second 450 and third 445 points are adjustable along lines 455, 460 parallel to the centerline 101.

In yet an further variant of the invention, the positions of the second 450 and third 445 points are adjustable toward and away from the centerline 101.

In still a further variant, as shown in FIG. 4, The first end 350 of the first segment 10a of the safety flying line 10 is divided into a first side portion 90, a second side portion 91 and a rear portion 92. The first 90 and second 91 side portions attach adjacent to the second 445 and third 450 points and are spaced equidistantly from the centerline 101 of the kite 250. The rear portion 92 attaches adjacent to the first point 360.

In yet a further variant, the positions of the first 360, second 445 and third 450 points are adjustable along lines 455, 460 parallel to the centerline 101.

In still a further variant, the positions of the second 445 and third 450 points are adjustable toward and away from said centerline 101.

In another variant, as shown in FIGS. 12 and 13, upper swivel 4 has a top portion 35 fitted within and secured to the lower end 315 of the trim line 1. The top portion 35 includes a protruding first bearing surface 465. A bottom portion 34 is provided that is formed as a cylinder and has a semi-enclosed upper end 475. The upper end 475 has a central opening 480 through it and a second mating bearing surface 485 disposed around the central opening 480. The second mating bearing surface 485 is sized and shaped to fit slidably upon the first bearing surface 465.

The exterior surface 470 of bottom portion 34 has a chamfered side opening 121 and a central projecting member 495. A containing cover 81 is provided. The cover 81 has a semi-enclosed upper end 3. The upper end 3 has a central opening 505 through it. The central opening 505 is sized and shaped to fit slidably over the trim line 1. The cover 3 is sized and shaped to fit slidably over the upper swivel 4.

In still another variant, the first bearing surface 465 and second mating bearing surface 485 are shaped to accommodate either of ball 150 and roller bearings 150 and the upper swivel 4 is a plurality of either of ball (not shown) and roller bearings (not shown).

In yet another variant, the trim line loop 30 is formed of resilient material and has a first end 119 and a second end 88. The first end 119 is attached to the bottom portion 345 of the upper swivel 4. The second end 88 has a loop fitting 120. The loop fitting 120 is sized and shaped to fit over the projecting member 495 and within the chamfered opening 121. When the loop fitting 120 is placed within the chamfered opening 121 over the projecting member 495 and the containing cover 3 is lowered over the upper swivel 4, the second end 88 of the trim line loop 30 will be secured to the bottom portion 345 of the upper swivel 4.

In yet an further variant, as shown in FIG. 14, the fixture 140 providing a point for attachment of the flying line 10 to a harness 425 has a coupling cord 520. The cord 520 has a first end 522 and a second end 524 and is attached at its first end 522 to the lower portion 400 of the lower swivel 5. A L-shaped hook 160 is provided. The hook 160 has an orifice 525 at a first end 530 and an upward facing point 535 at a second end 540 and is attached to the second end of the coupling cord 520 at the orifice.

Referring to FIGS. 14 and 16, a retaining lanyard is provided 545. The lanyard 545 has a first end 550 and a second end 555 and is attached at the first end 550 to either the orifice 525 or the coupling cord 520. The lanyard 545 has a loop 560 at the second end 555 and is sized and shaped to fit slidably over the upward facing point of the L-shaped hook 160. A retaining cap 7 is provided. The cap 7 is sized and shaped to fit slidably over the L-shaped hook 160 and has a semi-enclosed upper end 565. The upper end 565 has a central opening 570 through it and the opening 570 is sized and shaped to fit slidably over the coupling cord 520. The cap 7 is disposed upon the coupling cord 520 above the L-shaped hook 160. When the lanyard 545 is passed through a ring 575 on a harness 425 and the loop 560 is fitted over the upward facing point 535 forming a closed connection to the ring 575 and the retaining cap 7 is lowered over the L-shaped hook 160, the safety flying line 10 will be rotatably and removably attached to the harness ring 575 through the lower swivel 5.

In still another variant of the invention, the length of the safety flying line 10 is adjustable, thereby providing a user with ability to control lift of the airfoil 60.

In yet another variant, as shown in FIGS. 1–16, a kite safety device 305 for a kite 250 that has an airfoil 60 with leading 20 and trailing 22 edges, at least two control lines 11, 12, 13, 14 attached to distal ends 110, 111 of the airfoil 60 and a control flying bar 50 attached to at least two of the control lines 11, 12, 13, 14.

The safety device 305 has a trim line 1. The trim line 1 has an upper end 310 and a lower 315 end and central passageway 320 extending from the upper end 310 to the lower end 315 and is sized and shaped to fit slidably through a central opening 70 in the control flying bar 50 of a kite 250.

A safety flying line is provided 10. The safety flying line 10 has a first end 600 and a second end 605 and is attached at its first end 600 to a first point 360 adjacent a midpoint 365 along a centerline 101 extending from the leading edge 20 to the trailing edge 22 of the kite 250. The second end 605 is attached to a fixture 140. The fixture 140 provides a point for attachment of the flying line 10 to a harness 425. When the control flying bar 50 is released a user will be free to rotate beneath the kite 250 and when tension is applied to the safety flying line 10, the kite 250 will begin to stall and the kite 250 will descend.

In a preferred embodiment, the above-described kite safety and control device includes a rapid depowering system. Referring now to FIGS. 17–20, there is illustrated a novel rapid depowering device adapted for use with the kite safety apparatus of the present invention. FIG. 17 shows the rapid depowering device in a closed a locked position, while FIG. 18 shows it in the open and unlocked position. FIG. 19 shows it installed on a kite and in the locked position, and FIG. 20 shows it opened to depower the kite.

The depowering device exploits the difference in tension load from the flying foil on the front control lines 11, 13 (which converge to form a single trim line) and the tension load from the flying foil on the back control lines 12, 14 (connected to the trailing edge of the airfoil). Further, it exploits the tension difference between the front control lines (attached to the corners of the front leading edge of the airfoil) and the safety line 10 (connected to the midpoint 365 of the leading edge of the airfoil).

FIGS. 17–20 collectively show that the rapid depowering device 700 comprises a base bracket 710 having a bracket lower end 720 with a hole 730 through which is disposed a swiveling eye hook 740 adapted for connection to a harness connection hook. The bracket upper end 750 includes means for capturing a pivoting quick release lever 760. Such means may comprise simply opposing throughholes 753, 757 through which the axle 765 is disposed. The quick release lever includes a bend 770 having a notch 780 for capturing and retaining a retention ball 790 disposed on the lower portion 1a of trim line 1. A quick release pull cord 800 is connected to the bend.

The bracket upper end further includes a pulley 810 installed on axle 765, or it may include another type of line routing structure, such as a fixed channel having a low friction surface, over which the lower portion 10d of safety line 10 and the lower portion 1a of trim line 1 are joined or otherwise converge and merge into a functionally single line. The safety line 10 includes an upper portion 10e rising to a connection with the leading edge of the airfoil, in which event it is referred to as the trim line, and a portion which rises to connect to the midpoint of the leading edge of the airfoil, in which event it is referred to as the safety line.

Preferably the quick release lever includes a tensioning saddle 820 on which the trim line rests and by which the trim line is urged into firm engagement within notch 780, such that retention ball 790 will not inadvertently release. The trim line also includes a pull ball 830 for use by the sportsman to pull the trim line down to bring the retention ball back into a locked position below the notch.

FIG. 18 shows that when the quick release lever is pulled into a open position, the retention ball 790 is released and pulley 800 is allowed to spool freely, thus permitting trim line 1 to feed up into the leading edge of the kite. This suddenly and dramatically decreases the angle of attack of the airfoil and therefore effectively depowers it, providing for rapid braking and injury avoidance.

FIG. 19 shows the rapid depowering device installed on a kite 250 and in the locked position, while FIG. 20 shows the depowering device opened to depower the kite. In each instance, the rapid depowering device is installed on a kite having four control lines, 11, 12, 13, and 14, each attached at the distal ends 110a, 111a, of the leading and trailing edges 20, 22, of the airfoil. When pull cord 800 is pulled, kite safety line 10 is allowed to spool freely over pulley 810, and trim line 1 rapidly ascends to change the angle of attack of the leading edge 20 of kite 250.

FIGS. 21A–C show different possible guide hole configurations for routing the trim line and safety lines through the control flying bar. FIG. 21A shows a first alternative trim line guide hole configuration 900, in which kite safety line 10 is routed through a hole 910 in an auxiliary guide hole tab 920 affixed to the side of the control flying bar, while trim line 1 is routed through the central opening 70 in the control flying bar. This configuration minimizes line tangling and friction.

FIG. 21B shows a second alternative trim line guide hole configuration 1000 in which kite safety line 10 and trim line 1 are routed through side-by-side guide holes 1010, and 1020, each bored through control flying bar 50.

Finally, FIG. 21C shows a third alternative trim line guide hole configuration 1100, in which kite safety line 10 is routed through central opening 70, while trim line 1 is routed through an opening 1110 in a auxiliary guide hole tab 1120 integrally affixed to the side of control flying bar 50.

Collectively, FIGS. 21A–C show that the guide hole configuration for routing the trim line and safety control line is subject to several variations and that to achieve the inventive function they need not jointly be routed through the central opening 70 in the control flying bar 50. Preferably, however, the control flying bar has first and second guide holes for routing the lower portions of the trim line and the safety control line. In the first preferred embodiment, the first and second guide holes each pass through the body portion 50a of the control flying bar, and the trim and safety flying lines are routed through these guide holes.

In a variation, the lower portion of the trim line is routed through a first guide hole in the body portion and the lower portion of said safety flying line is routed through a second guide hole in an auxiliary guide hole tab affixed to the body portion.

In yet another variation, the lower portion of the safety flying line is routed through a first guide hole in the body portion and the lower portion of the trim line is routed through the second guide hole in an auxiliary guide hole tab.

FIGS. 22 and 23 show the rapid depowering device installed on a kite 1200 having only two control lines, first and second control lines, 1210, 1220, affixed at their upper ends to the distal ends 1230, 1240 of the airfoil where the leading and trailing edges 1250, 1260 converge. As in the installation on a four control line kite, the safety flying line 10 connects at its upper end to a safety line connection point 1270 adjacent a midpoint along a centerline extending from the leading edge to the trailing edge of the kite. The safety flying line extends downwardly through a guide hole 1280 either in the body of the control flying bar 50 or in an auxiliary tab 1290, as described above. The line continues downwardly and is routed through a depowering device 1300, also as described above (shown in FIG. 22 in its locked position). In this instance, however, trim line 1 is does not extend upwardly through the control flying bar to a connection with control lines. Rather, it extends only up to a trim line connection point 1310 where it is firmly affixed to the control flying bar.

Accordingly, referring now to FIG. 23, when the depowering device is released into its open and unlocked position 1320, the control flying bar is allowed to ascend so that the distal ends of the leading and trailing edges of the air foil rise and rapidly change the effective angle of attack and shape of the airfoil.

Thus, in a most essential aspect, it will be seen that the kite safety, control, and rapid depowering device of the present invention is adapted for use with a kite having an airfoil having distal ends, a leading edge, a trailing edge, at least two control lines attached to the distal ends of the airfoil, and a control flying bar attached to at least two control line. While it is preferable that the apparatus be employed with a kite having at least four control lines, it is possible to employ with a two line kite as well. The apparatus includes a trim line having an upper end and a lower end, and the trim line is either affixed at its upper end to the control flying bar or slidably disposed through an opening in the control flying bar for connection to control lines. The apparatus further includes a safety flying line having an upper portion which is attached to a first point adjacent a midpoint along a centerline extending from the leading edge to the trailing edge of the airfoil; it also includes a lower portion attached to the lower portion of the trim line such that the trim line and safety flying line effectively form a single and continuous line. The apparatus further includes a depowering device disposed at the lower portions of the trim and safety lines and interposed between those lines when the kite is powered.

In a preferred embodiment of the depowering apparatus, the lower portion of the trim line includes an expansion, such as a retention ball (see FIGS. 17–23, element 790), and the depowering mechanism comprises a base bracket with an upper end and a lower end, harness connection means disposed on the lower end of the base bracket for connecting the depowering apparatus to a kite harness, low friction line release means for permitting substantially unimpeded longitudinal movement of the trim line (and/or the control flying bar), and a locking/release lever pivotally connected to the base bracket. The locking/release lever includes retention means for capturing and retaining the expansion on the trim line.

Further, the preferred embodiment of the depowering mechanism assembly includes a quick release pull cord, whereby when the pull cord is pulled, the retention means of the quick release lever releases the expansion and the trim line and/or control flying bar is/are allowed to ascend substantially without obstruction to change the angle of attack of the airfoil. The retention means preferably comprises a notch in the quick release lever. In order to capture and hold the expansion, the notch opens downwardly toward the lower portion of said trim line.

The quick release lever preferably includes a tensioning saddle on which the lower portion of the trim line is disposed when the kite is powered. When the quick release lever is in the closed and locked position, the saddle pushes the trim line upwardly into the notch in the quick release lever so as to prevent release of the trim line.

In the most preferred embodiment, the quick release lever includes an axle disposed on the lower end of the base bracket, and the low friction line release means is a pulley coaxially disposed on the axle.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A kite safety, control, and rapid depowering device for a kite having an airfoil having distal ends, a leading edge, a trailing edge, at least two control lines attached to the distal ends of the airfoil, and a control flying bar attached to at least two control lines, said safety device comprising:
   a trim line having an upper end and a lower end;
   a safety flying line having an upper portion attached to the airfoil at a first point adjacent a midpoint along a centerline extending from the leading edge to the trailing edge of the airfoil, and a lower portion attached to said upper end of said trim line such that said trim line and said safety flying line form a continuous line; and
   a depowering apparatus operatively engaging said trim line and said safety flying line when the kite is powered.

2. The apparatus of claim 1, further including a retention ball disposed on said lower portion of said trim line, and wherein said depowering apparatus includes:
   a base bracket having an upper end and a lower end;
   harness connection means disposed on said lower end of said base bracket for connecting said depowering apparatus to a kite harness;
   low friction line release means for permitting substantially unimpeded longitudinal movement of said trim line; and
   a quick release lever pivotally connected to said base bracket, said quick release lever having retention means for capturing and retaining said retention ball.

3. The apparatus of claim 2, wherein the kite includes four control lines, including first and second control lines connected to said control flying bar and to the distal ends of the trailing edge of the airfoil, and wherein said trim line is slidably disposed through an opening in said control flying bar and connects at said upper end to third and fourth control lines connected to the leading edge of the airfoil.

4. The apparatus of claim 3, further including an adjustable strap interposed between said upper end of said trim line and said third and fourth control lines.

5. The apparatus of claim 2, wherein the kite includes first and second control lines connected to said control flying bar and to the distal ends of the trailing edge of the airfoil, and wherein the upper end of said trim line is affixed to said control flying bar.

6. The apparatus of claim 2, further including a quick release pull cord, whereby when said pull cord is pulled, said retention means releases said expansion and said trim line is allowed to ascend to change the angle of attack of the airfoil.

7. The apparatus of claim 2, where said retention means comprises a notch in said quick release lever, said notch open downwardly toward said lower portion of said trim line.

8. The apparatus of claim 4, wherein said quick release lever includes a tensioning saddle on which said lower portion of said trim line rests when said kite is powered and by which said trim line is urged into firm engagement within said notch such that said expansion will not inadvertently release.

9. The apparatus of claim 2, wherein said harness connection means is an eye hook swivelingly connected to said lower end of said base bracket.

10. The apparatus of claim 2, further including an axle disposed on said lower end of said base bracket, and wherein said low friction line release means is a pulley coaxially disposed on said axle.

11. The apparatus of claim 2, wherein said low friction line release means is a fixed channel disposed on said lower end of said base bracket.

12. The apparatus of claim 2, wherein said trim line further includes a pull ball.

13. The apparatus of claim 1, further including a control flying bar having first and second guide holes for routing said lower portions of said trim line and said safety control line.

14. The apparatus of claim 10, wherein said control flying bar has a body portion and wherein said first and second guide holes each pass through said body portion.

15. The apparatus of claim 12, wherein said lower portion of said trim line is routed through said first guide hole and said lower portion of said safety flying line is routed through said second guide hole.

16. The apparatus of claim 10, wherein said control flying bar has a body portion with a first guide hole and an auxiliary guide hole tab integrally affixed to said body portion and having a second guide hole, and wherein said lower portion of said trim line is routed through said first guide hole and said lower portion of said safety flying line is routed through said second guide hole.

17. The apparatus of claim 10, wherein said control flying bar has a body portion with a first guide hole and an auxiliary guide hole tab integrally affixed to said body portion and having a second guide hole, and wherein said lower portion of said safety flying line is routed through said first guide hole and said lower portion of said trim line is routed through said second guide hole.

* * * * *